US006721212B2

(12) United States Patent
Sasaki

(10) Patent No.: US 6,721,212 B2
(45) Date of Patent: Apr. 13, 2004

(54) MEMORY CONTROL CIRCUIT AND CONTROL SYSTEM FOR A PLURALITY OF MEMORIES INTERCONNECTED VIA PLURAL LOGIC INTERFACES

(75) Inventor: Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 10/334,893

(22) Filed: Jan. 2, 2003

(65) Prior Publication Data

US 2003/0137881 A1 Jul. 24, 2003

(30) Foreign Application Priority Data

Jan. 9, 2002 (JP) .................................. 2002-002184

(51) Int. Cl.[7] ................................................ G11C 7/10
(52) U.S. Cl. ........................... 365/189.11; 365/189.05; 365/189.02; 365/228; 365/226; 326/70; 326/71; 326/68
(58) Field of Search .................. 365/189.05, 189.11, 365/226, 227, 228, 189.02; 326/63, 68, 70, 71

(56) References Cited

U.S. PATENT DOCUMENTS

| 5,687,382 | A | * | 11/1997 | Kojima et al. ............... 713/320 |
| 6,161,162 | A | * | 12/2000 | DeRoo et al. ............... 710/244 |
| 6,247,084 | B1 | * | 6/2001 | Apostol et al. ............. 710/108 |
| 6,324,115 | B1 | * | 11/2001 | Choi ...................... 365/230.03 |
| 6,327,204 | B1 | * | 12/2001 | Kook et al. ................. 365/207 |
| 6,505,282 | B1 | * | 1/2003 | Langendorf et al. ........ 711/170 |

FOREIGN PATENT DOCUMENTS

| JP | 11-149334 | 6/1999 | ............. G06F/3/00 |
| JP | 2000-10683 | 1/2000 | ............. G06F/3/00 |
| JP | 2000-105644 | 4/2000 | ............. G06F/3/00 |

* cited by examiner

*Primary Examiner*—Andrew Q. Tran
(74) *Attorney, Agent, or Firm*—Oblon, Spivak, McClelland, Maier & Neustadt, P.C.

(57) ABSTRACT

A memory control circuit includes a controller (1A) for controlling a RAM (13) conforming to the standard where source voltage is 2.5 V (SSTL2 standard), and a nonvolatile memory (14) conforming to the standard where source voltage is 3.3 V (LVTTL standard) via a control bus (10) and data buses (11, 12). The control bus (10) for transmitting an address signal and a control signal is shared by these memories (13, 14). The controller (1A) converts internal signals to signals conforming to the standard where source voltage is 2.5 V and outputs the converted signals to the control bus (10). The data buses (11, 12) are provided for the respective memories (13, 14) independently. The number of signal lines can be reduced, and it is possible to prevent signals at high voltage level outputted from the nonvolatile memory (14) from being applied to the RAM (13) driven at low voltages, to cause an occurrence of malfunction at the RAM (13).

9 Claims, 14 Drawing Sheets

MEMORY CONTROL CIRCUIT AND CONTROL SYSTEM FOR A PLURALITY OF MEMORIES INTERCONNECTED VIA PLURAL LOGIC INTERFACES

BACKGROUND OF THE INVENTION

1. Field of the Invention

The present invention relates to a memory control circuit for controlling a plurality of memories corresponding to a plurality of logic interfaces, respectively.

2. Description of the Background Art

A controller incorporating a CPU (central processing unit) usually requires two kinds of memories: nonvolatile memories such as a ROM (Read Only Memory) for storing an activation program, initial data and the like and a flash memory (hereinafter, referred to as "boot memory"), and volatile RAMs (Random Access Memory) used for storage of loaded programs and temporary storage of variables. The controller and these memories are interconnected via a bus, and as a logic interface standard for connecting these controller and memories, TTL (Transistor—Transistor Logic) and LVTTL (Low-Voltage TTL), SSTL (Stub Series Terminated Logic), LS-TTL (Low power Schottky-TTL) and the like are employed.

Each memory has an input/output interface (level shifter) for converting an input voltage into an internal voltage and converting the internal voltage into an output voltage according to the logic interface. For example, according to the LVTTL standard defined by the standardization organism JEDEC (Joint Electron Device Engineering Council), with respect to a source voltage $V_{DD}$, input voltages that are determined as "high level" ($V_{IH}$) are defined in the range of 2 V (volts) to $V_{DD}$+0.3 V (volts), input voltages that are determined as "low level" ($V_{IL}$) are defined in the range of −0.3 V (volts) to +0.8 V (volts), and values in the vicinity of 3.3 V are recommended as the value of the source voltage $V_{DD}$. Also according to the LVTLL standard, the minimum value of high level output voltages ($V_{OH}$) is defined as 2.4 V, and the maximum value of low level output voltages ($V_{OH}$) is defined as 0.4 V.

In the case where the above-mentioned boot memory and the RAM use the same logic interface, a bus can be shared for transmitting address signals, control signals and data signals without any problems. However, if such a bus is shared in the condition that these memories use different logic interfaces and thus the source voltages $V_{DD}$ are different, a voltage higher than the input withstand pressure is applied to a memory supporting lower source voltage, causing a latch-up and the like, which triggers a breakdown in the input/output interface, instability of operation of the memory and the like problems. In order to avoid such problems, the bus wiring can be arranged individually and separately for each of the memories using different source voltages $V_{DD}$.

FIG. 13 is a schematic view showing one example of a memory control circuit adopting separate bus wiring for individual memories. This memory control circuit includes a controller $100_1$ incorporating a CPU 101, a boot memory 115 implemented by a nonvolatile memory, and a RAM 114. The source voltage $V_{DD}$ of the RAM 114 is 2.5 V, the source voltage $V_{DD}$ of the boot memory 115 is 3.3 V, and these memories adopt different source voltages.

Between the controller $100_1$ and the RAM 114 a first control bus 110 for transmitting address signals and control signals to the RAM 114 and a first data bus 111 for transmitting data signals are disposed, and between the controller $100_1$ and the boot memory 115 a second control bus 112 which is separate from the control bus 110 and a second data bus 113 which is separate from the data bus 111 are disposed.

The controller $100_1$ is equipped with a MIU (memory interface) 102 for performing memory management with respect to the RAM 114 and the nonvolatile memory 115. The CPU 101 first issues an access request with respect to the MIU 102 when accessing to the RAM 114 or the nonvolatile memory 115. After approving the access request, the MIU 102 fetches an address signal AD0 and a control signal CT0 transmitted from the CPU 101 and outputs these signals as an address signal $AD_{in}$ and a control signal $CT_{in}$ in predetermined timing.

Also the controller 100, is equipped with a PAD circuit 105 supporting a logic interface of the RAM 114 and a PAD circuit 106 supporting a logic interface of the nonvolatile memory 115.

The PAD circuit 105 supporting the low voltage standard of the RAM 114 has two level converters 105A and 105B for converting voltage level of input signal. In accessing and writing to the RAM 114, the level converter 105A converts the voltage levels of an address signal $AD_{in}$ and a control signal $CT_{in}$ inputted from the memory controller 103 and outputs signals after conversion to the control bus 110 via an output port 107A for supplying to the RAM 114. Also write data DO output from the CPU 101 is converted into data RD at the level converter 105B and transferred via the data bus 111 from an input/output port 107B to the RAM 114 to be written therein. On the other hand, in accessing the RAM 114 for reading, a data signal read from the RAM 114 is transferred via the data bus 111 to be inputted to the input/output port 107B, and converted at the level converter 105B into data $RD_{in}$ and inputted to the "1" side terminal of the selector 104. At this time, the memory controller 103 supplies the selector 104 with a selection signal of high level. In response to this selection signal, the selector 104 selects the data $RD_{in}$ and outputs it as readout data DI to the CPU 101.

On the other hand, the PAD circuit 106 which supports the high voltage standard of the nonvolatile memory 115 has two level converters 106A and 106B. When accessing the nonvolatile memory 115 for reading, the level converter 106A converts the voltage levels of an address signal $AD_{in}$ and a control signal $CT_{in}$ inputted from the memory controller 103 and outputs signals after conversion to the control bus 112 via an output port 107C for supplying to the nonvolatile memory 115. Then a data signal read out from the nonvolatile memory 115 is transferred to an input port 107D via the data bus 113 and converted to data $NVD_{in}$ at the level converter 106B to be inputted to the "0" side terminal of the selector 104. At this time, since the memory controller 103 supplies the selector 104 with a selection signal of low level, the selector 104 selects data $NVD_{in}$ in response to that selection signal, and outputs it to the CPU 101 as readout data DI.

In the above-described memory control circuit shown in FIG. 13, it is necessary to provide separate bus wirings for each memory. Therefore, the number of signal lines for buses 110, 111, 112 and 113 increases, which leads the problem well known in the art that the number of terminals (pin number) to be provided at the input/output ports 107A to 107D on the end of the controller $100_1$ significantly increases. For solving such kinds of problems, a memory control circuit having a configuration as shown in FIG. 14 can be employed.

In the memory control circuit shown in FIG. 14, a control bus 120 and a data bus 121 are shared by the RAM 114 (source voltage 2.5 V standard) and the nonvolatile memory 115 (source voltage 3.3 V standard). In order to prevent voltages higher than the allowable value from traveling the data bus 121 and applied to the RAM 114, a data signal outputted from the nonvolatile memory 115 is converted into a signal conforming to the low voltage standard for the RAM 114 at a level converter 123 and then outputted to the data bus 121.

The controller $100_2$ described above includes a PAD circuit 105 conforming to the low voltage standard of the RAM 114, a CPU 101 and a memory interface 102. When accessing the memories 114 and 115, as is the same with the operation of the controller $100_1$ shown in FIG. 13, the CPU 101 first issues an access request with respect to the MIU 102. After approving the access request, the MIU 102 fetches an address signal AD0 and a control signal CT0 transferred from the CPU 101 and outputs them as an address signal $AD_{in}$ and a control signal $CT_{in}$ in predetermined timing.

At the PAD circuit 105, the level converter 105A converts the voltage levels of the input signals $AD_{in}$ and $CT_{in}$ and outputs signals after conversion to the control bus 120 via the output port 107A for supplying to the memories 114 and 115. In accessing the RAM 114 for writing, the level converter 105B converts the level of the data DO transferred from the CPU 101 and outputs a signal after conversion to the data bus 121 via the input/output port 107B for supplying to the RAM 114. On the other hand, when accessing the RAM 114 for reading, a data signal MD read out from the RAM 114 is transferred to the input port 107B via the data bus 121, converted to readout data DI at the level converter 105B and then inputted to the CPU 101.

In the period during which the nonvolatile memory 115 is accessed for reading, the memory controller 103 supplies an AND gate (logical product element) 122 with an output enable signal OE and a chip select signal CS which are both at high level, and the AND gate 122 supplies the level converter 123 with an approval signal of high level. The level converter 123 converts the level of the data signal read out from the nonvolatile memory 115 and inputting thereto and outputs the resultant data signal to the data bus 121 just in the period during which it receives the approval signal.

Although the memory control circuit shown in FIG. 14 and described above solves the problems associated with the memory control circuit shown in FIG. 13, it is necessary to dispose the level converter 123. There is still a problem that this level converter 123 causes increase in power consumption and decrease in operation speed of the data bus 121.

SUMMARY OF THE INVENTION

It is an object of the present invention to provide a memory control circuit and a memory control system which are capable of controlling a plurality of memories conforming to different source voltage standards from each other with low power consumption, and reducing the number of signal lines disposed between a controller and these memories, while realizing stable operation.

According to a first aspect of the present invention, a memory control circuit controls a plurality of memories having logic interfaces corresponding to different source voltages from each other, which includes a control bus, a first data bus, a second data bus and a controller. The control bus includes signal lines for transmitting an address signal and a control signal to and from a low voltage memory which operates at the minimum source voltage among the plurality of memories. The first data bus includes signal lines for transmitting data signals to and from the low voltage memory. The second data bus includes signal lines for transmitting data signals to and from a high voltage memory operating at a source voltage higher than the source voltage of the low voltage memory among the plurality of memories, and disposed independently from the first data bus. The controller accesses the low voltage memory and the high voltage memory via the control bus, first data bus and second data bus. The control bus has signal lines which branch off the signal lines of the control bus to be connected to the high voltage memory and transmit an address signal and a control signal to the high voltage memory.

According to the first aspect of the present invention, an address signal and a control signal supplied to the low voltage memory and the high voltage memory are transmitted via the common control bus. Therefore, the number of signal lines of the control bus can be reduced, and the number of pins for data input/output at the controller can be reduced. In addition, since the number of signal lines of the control bus is small, power consumption at the memory control circuit can be reduced. Furthermore, since the address signal and the control signal are transmitted at a voltage level in conformance with the logic interface of low voltage level, a voltage exceeding the acceptable level will not be applied to the low voltage memory, resulting that both the low voltage memory and the high voltage memory can be operated in a stable manner.

According to a second aspect of the present invention, in the memory control circuit according to the first aspect of the present invention, the controller includes first to third level converters. The first level converter outputs the address signal and the control signal obtained by converting voltage levels of internal signals in accordance with the input voltage defined by the logic interface of the low voltage memory to the control bus. The second level converter converts voltage level of an input signal or an output signal in accordance with an input voltage or an output voltage defined by the logic interface of the low voltage memory, and sends/receives the data signal via the first data bus. The third level converter converts voltage level of an input signal or an output signal in accordance with an input voltage or an output voltage defined by the logic interface of the high voltage memory, and sends/receives the data signal via the second data bus.

According to a third aspect of the present invention, in the memory control circuit according to the first or second aspect of the present invention, the range of output voltages defined by the logic interface of the low voltage memory is included in a range of input voltages defined by the logic interface of the high voltage memory.

According to a fourth aspect of the present invention, in the memory control circuit according to any of the first to third aspects of the present invention, a RAM (random access memory) is used as the low voltage memory, and a nonvolatile memory is used as the high voltage memory.

According to a fifth aspect of the present invention, in the memory control circuit according to the fourth aspect of the present invention, the first data bus branches off to be connected to the high voltage memory for transmitting either one or both of the address signal and the control signal to the high voltage memory.

According to a sixth aspect of the present invention, a memory control circuit includes a controller which accesses one of a first memory group and a second memory group. The first memory group includes a plurality of memories having logic interfaces corresponding to different source voltages from each other, and the second memory group includes a plurality of memories having logic interfaces corresponding to the same source voltage as each other. The memory control circuit according to the sixth aspect of the present invention is provided with a memory control circuit according to any of the first to fifth aspects when the controller accesses the first memory group. In the memory control circuit according to the sixth aspect of the present invention, when the controller accesses the second memory group, the control bus and the first data bus in the memory control circuit according to any of the first to fifth aspects of the present invention are shared and connected with all the memories of the second memory group, and the second data bus in the memory control circuit according to any of the first to fifth aspects of the present invention is used for signal transmission other than the sending/receiving of control signal and data signal to/from the memories.

According to the sixth aspect of the present invention, when the controller accesses the second memory group, the controller can use the second data bus and the third level converter usable in accessing to the first memory group, for signal transmission other than sending/receiving of control signal and data signal to/from the memories, so that a general-purpose memory control circuit can be realized.

Next, according to a seventh aspect of the present invention, a memory control circuit can control a plurality of memories having logic interfaces supporting different source voltages from each other, and includes a control bus, a first data bus, a second data bus and a controller. The control bus includes signal lines for transmitting an address signal and a control signal to and from a main memory which operates at the minimum source voltage among the plurality of memories. The first data bus transmits a data signal to and from the main memory. The second data bus transmits a data signal which conforms to the logic interface of a boot memory operating at a higher source voltage than the source voltage of the main memory among the plurality of memories. And the controller accesses the main memory to perform activation process of the memory control circuit. In the memory control circuit according to the seventh aspect of the present invention, when the second data bus is not connected to the boot memory, the second data bus is connected to an external controller for transferring initial data required for the activation process, and the controller controls so as to store the initial data transferred from the external controller in the main memory and thereafter performs the activation process using the initial data.

According to the seventh aspect of the present invention, the second data bus provided for the boot memory can be used as a bus for transmitting the initial data required for activation process. Therefore, the memory control circuit according to the present aspect does not need to have a second boot memory since it executes a slave operation of loading initial data for activation from the external controller, with the result that reduction in substrate area as well as reduction in power consumption can be realized. In addition, since the pins connected to the second data bus can be used as functional pins dedicated for loading of initial data, another functional pins are not necessary for the slave operation, which provides an advantage that the function is not restricted.

According to an eighth aspect of the present invention, in the memory control circuit according to the seventh aspect of the present invention, the controller includes first to third level converters. The first level converter outputs to the control bus an address signal and a control signal obtained by converting voltage levels of internal signals in accordance with an input voltage defined by the logic interface of the main memory. The second level converter converts voltage level of an input signal or an output signal in accordance with an input voltage or an output voltage defined by the logic interface of the boot memory, and sends/receives the data signal via the first data bus. The third level converter converts voltage level of an input signal or an output signal in accordance with an input voltage or an output voltage defined by the logic interface of the controller, and receives the initial data via the second data bus.

According to a ninth aspect of the present invention, a control system includes a memory control circuit according to the seventh or eighth aspect of the present invention, and an external controller for transmitting initial data required for the activation process to the memory control circuit.

These and other objects, features, aspects and advantages of the present invention will become more apparent from the following detailed description of the present invention when taken in conjunction with the accompanying drawings.

DESCRIPTION OF THE PREFERRED EMBODIMENTS

Various preferred embodiments according to the present invention will now be described.

(First Preferred Embodiment)

Figure 1:
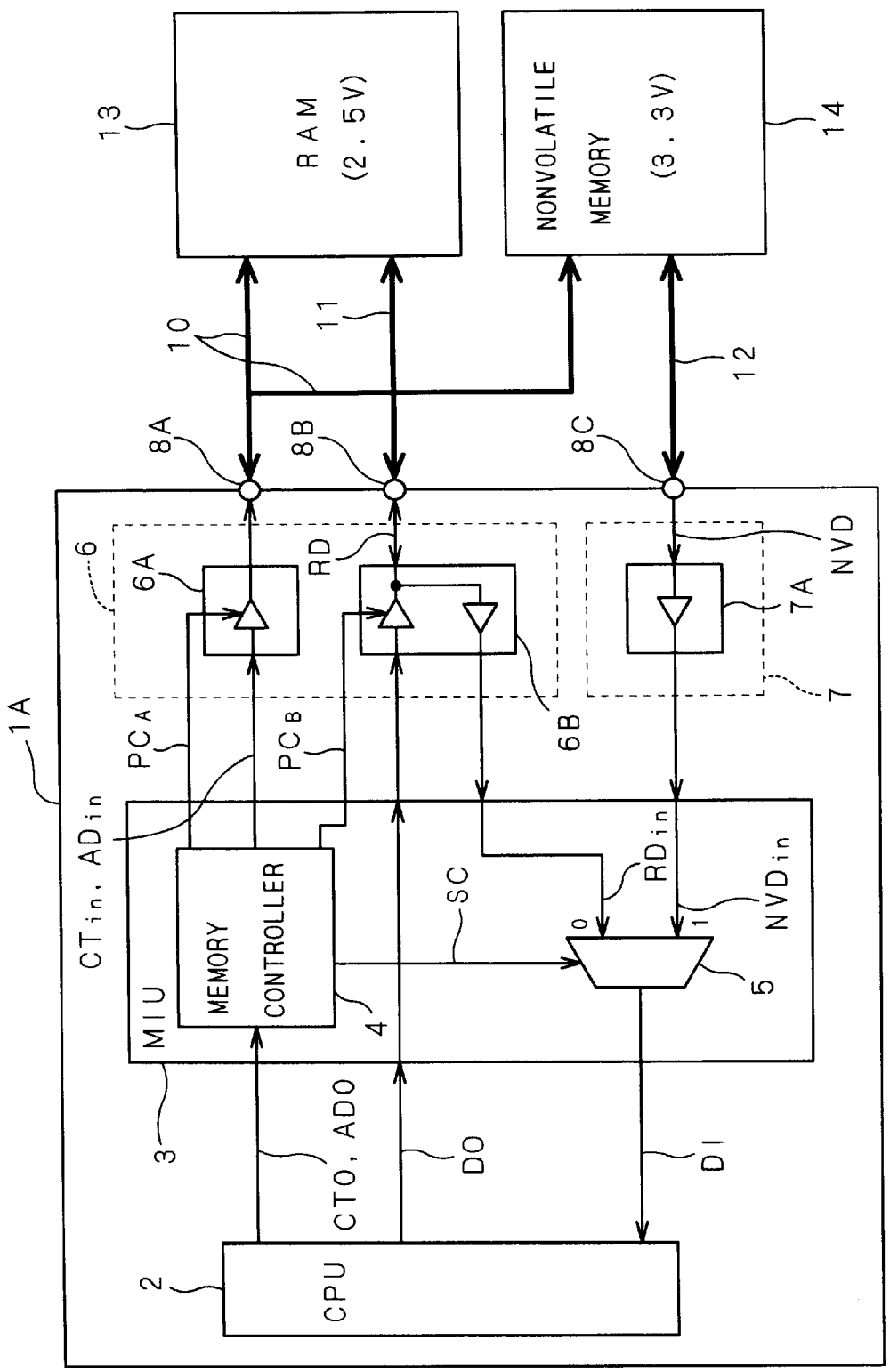
FIG. 1 is a schematic configuration view showing a memory control circuit according to the first embodiment of the present invention.

FIG. 1 is a schematic configuration view of a memory control circuit according to the first embodiment of the present invention. This memory control circuit is an integrated circuit having a controller 1A which controls two kinds of memories 13 and 14 having logic interfaces of different source voltages $V_{DD}$ via buses 10, 11 and 12.

The first memory 13 is a RAM having an input/output interface which operates at a source voltage $V_{DD}$=2.5 V, and the second memory 14 is a nonvolatile memory having an input/output interface which operates at a source voltage $V_{DD}$=3.3 V. The RAM 13 implemented by a DRAM (Dynamic Random Access Memory) or an SRAM, for example, can be used as a main memory for temporarily storing variables and data generated during execution of program. The nonvolatile memory 14 implemented by a mask ROM or a flash memory, for example, stores read-only data such as a boot program required in activation of the system and initial data required in executing a program.

Between an output port 8A of the controller 1A and the RAM 13 and the nonvolatile memory 14 is disposed a control bus 10 consisting of a plurality of signal lines for transmitting an address signal for designating an address on the memories 13 and 14 and a control signal required for writing and reading of data. This control bus 10 is connected to a controlling input terminal of the RAM 13 and a controlling input terminal of the nonvolatile memory 14, and shared by the memories 13 and 14.

Also, between an input/output port 8B of the controller 1A and the RAM 13 is disposed a data bus 11 consisting of a plurality of signal lines for transmitting write data or readout data of the RAM 13, and this data bus 11 is connected with a data input/output terminal of the RAM 13. Also, between an input port 8C of the controller 1A and the nonvolatile memory 14 is disposed a data bus 12 consisting of a plurality of signal lines for transmitting write data or readout data of the nonvolatile memory 14, and this data bus 12 is connected with a data input/output terminal of the nonvolatile memory 14. Accordingly, two data buses 11 and 12 are individually disposed for the RAM 13 and the nonvolatile memory 14.

In addition, the controller 1A includes a MIU (memory interface unit) 3 for performing memory management of the RAM 13 and the nonvolatile memory 14, a PAD circuit 6 for converting voltage level of input/output signal in conformance with the logic interface of the RAM 13, a PAD circuit 7 for converting voltage level of input/output signal in conformance with the logic interface of the nonvolatile memory 14, and a CPU (micro processor) 2. This CPU 2 loads program data stored in the nonvolatile memory 14 at the time of activation of the controller 1A and uses the RAM (main memory) 13 as a work area for temporarily storing command groups and data being used during execution of the program data.

Also, the MIU 3 is equipped with a memory controller 4 and a selector 5. In accessing the RAM 13 or the nonvolatile memory 14, the CPU 2 first issues an access request with respect to the MIU 3. After approving the access request, the MIU 3 fetches an address signal AD0 and a control signal CT0 transferred via an internal bus (not shown) from the CPU 2 and outputs them to the PAD circuit 6 in predetermined timing. In practice, not only from the CPU 2 but also from other processing circuits (not shown) such as a DMA (direct memory access) controller, a plurality of access requests can be inputted to the MIU 3 simultaneously. Therefore, in order to arbitrate the competition condition of these plural accesses requests, the MIU 3 sets priority between each access request and gives an access approval to a related processing circuit in accordance with this priority. Then the MIU 3 outputs an address signal $AD_{in}$ and a control signal $CT_{in}$ transferred from that processing circuit to the PAD circuit 6.

In the PAD circuit 6, a level converter 6A operates in synchronization with a control signal $PC_A$ supplied from the memory controller 4, converts the internal voltage levels of the address signal $AD_{in}$ and the control signal $CT_{in}$ transferred from the memory controller 4 in conformance with the logic interface of the RAM 13 driven at low voltage, and outputs signals after conversion to the control bus 10 via the output port 8A.

Also, a level converter 6B operates in synchronization with a control signal $PC_B$ supplied from the memory controller 4, converts the internal voltage level of data DO outputted from the CPU 2 and inputted via the MIU 3 in conformance with the logic interface of the RAM 13 and outputs data after conversion RD to the data bus 11 via the input/output port 8B. Also, the level converter 6B may convert the voltage level of the data RD inputted from the data bus 11 via the input/output port 8B into an internal voltage level, and output data after conversion $RD_{in}$ to the "0" side terminal of the selector 5. The selector 5 selects either one of the "0" side terminal or "1" side terminal in accordance with the logic level of a selection signal SC supplied from the memory controller 4, and outputs data inputting to that terminal to the CPU 2 as election data DI. Therefore, the selector 5 outputs the data $RD_{in}$ inputting to the "0" side terminal to the CPU 2 when the selection signal SC of low level is supplied to the selector 5.

Also, data NVD read out from the nonvolatile memory 14 driven at high voltage travels the data bus 12 and inputs to the PAD circuit 7 via the input port 8C. A level converter 7A of the PAD circuit 7 converts the voltage level of the input data NVD into an internal voltage level, and outputs data $NVD_{in}$ after conversion to the "1" side terminal of the selector 5. The selector 5 outputs the data $NVD_{in}$ inputted at its "1" side terminal to the CPU 2 while receiving the selection signal SC of high level.

In this manner, the address signal and the control signal outputted from the controller 1A are converted into signals conforming to the logic interface supporting low source voltage (hereinafter, referred to as low voltage interface) by the level converter 6A, and thereafter transmitted to the RAM 13 and the nonvolatile memory 14 via the common control bus 10. Therefore, it is possible to prevent a voltage higher than the input withstand pressure from being applied to the controlling input terminals of the memories 13 and 14. In addition, since the number of signal lines for buses is reduced, it is possible to realize lower power consumption while reducing the number of terminals (pin number) of the input/output ports 8A to 8C at the controller 1A end.

Further, since the data buses 11 and 12 are independently provided for the RAM 13 and the nonvolatile memory 14, the data signal read out from the nonvolatile memory 14 driven at high voltage will not be transmitted to the RAM 13 driven at low voltage, making it possible to prevent malfunctions such as latch up from occurring in the RAM 13.

In this first embodiment, the PAD circuit 7 is equipped with the level converter 7A for input which converts only input signals since an assumption is made that the nonvolatile memory 14 driven at high voltage is used as a read only memory storing a program. Furthermore, when using a writable memory such as flash memory as the nonvolatile memory 14, the PAD circuit 7A may have a function of converting levels of not only input data (readout data) but also output data (write data) as is the case of the aforementioned level converter 6B.

By the way, the nonvolatile memory 14 having a logic interface supporting high source voltages (hereinafter, referred to as "high voltage interface") receives the output signal conforming to the low voltage interface, and has to determine whether the logic level of that signal is the high level or the low level. In order to achieve this, it is preferred that a range defining output voltages ($V_{OH}$, $V_{OL}$) of low voltage interface is included in a range defining input voltages ($V_{IH}$, $V_{IL}$) of high voltage interface.

In the following, explanation will be made for the case where the SSTL2 standard ($V_{DD}$=2.5 V) is employed as the logic interface of the RAM 13, and the LVTTL standard ($V_{DD}$=3.3 V) is employed as the logic interface of the nonvolatile memory 14. As described above, according to the LVTTL standard, input voltages ($V_{IH}$) which are determined as being at high level fall within the range of $V_{IH}$=2 V to $V_{DD}$+0.3 V=2 V to 3.6 V, and input voltages ($V_{IL}$) which are determined as being at low level fall within the range of $V_{IL}$=−0.3 V to 0.8 V.

Figure 2:
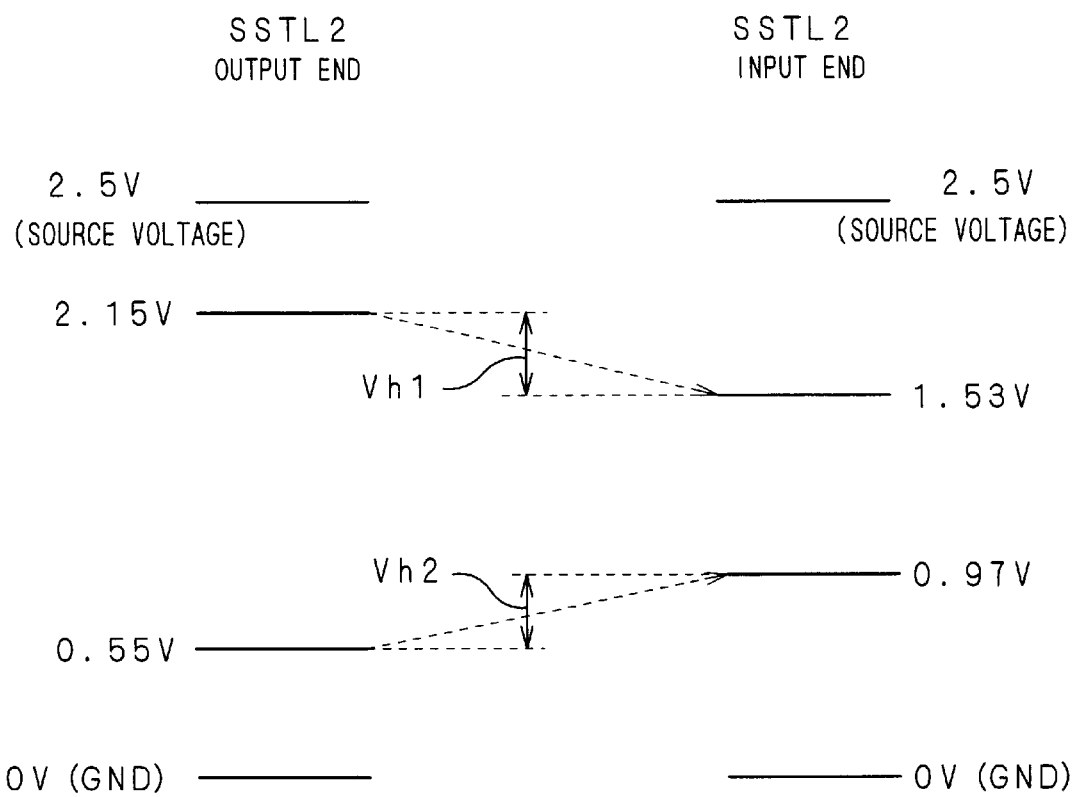
FIG. 2 is a schematic view showing an example of voltage levels at the output end and input end of signal.

On the other hand, the SSTL2 standard defines a reference voltage $V_{ref}$, which is set in the range of $V_{ref}$=1.15 V to 1.35 V. FIG. 2 shows voltage levels at the output end and at the input end of signal. The minimum value of input voltages that are determined as being at high level is $V_{IH}(\min)=V_{ref}$+0.18, while the maximum value of input voltages that are determined as being at low level is $V_{IL}(\max)=V_{ref}$−0.18 V. As shown in FIG. 2, at the input end of signal, the minimum value of input voltages to be determined as high level is set $V_{IH}(\min)$=(maximum value of $V_{ref}$)+0.18 V=1.53 V, and the maximum value of input voltages to be determined as low level is set $V_{IL}(\max)$=(minimum value of $V_{ref}$)−0.18 V=0.97 V. Also, at the output end of signal, the minimum value for output voltages of high level can be set at 2.15 V, and the maximum value for output voltages of low level can be set at 0.55 V. Therefore, it is possible to provide a margin of Vh1=0.62 V between the minimum value (=2.15 V) for output voltages of high level and the minimum value (=1.53 V) of input voltages to be determined as being at high level. Also, it is possible to provide a margin of Vh2=0.42 V between the maximum value (=0.55 V) for output voltages of low level and the maximum value (=0.97 V) of input voltages to be determined as being at low level.

Figure 3:
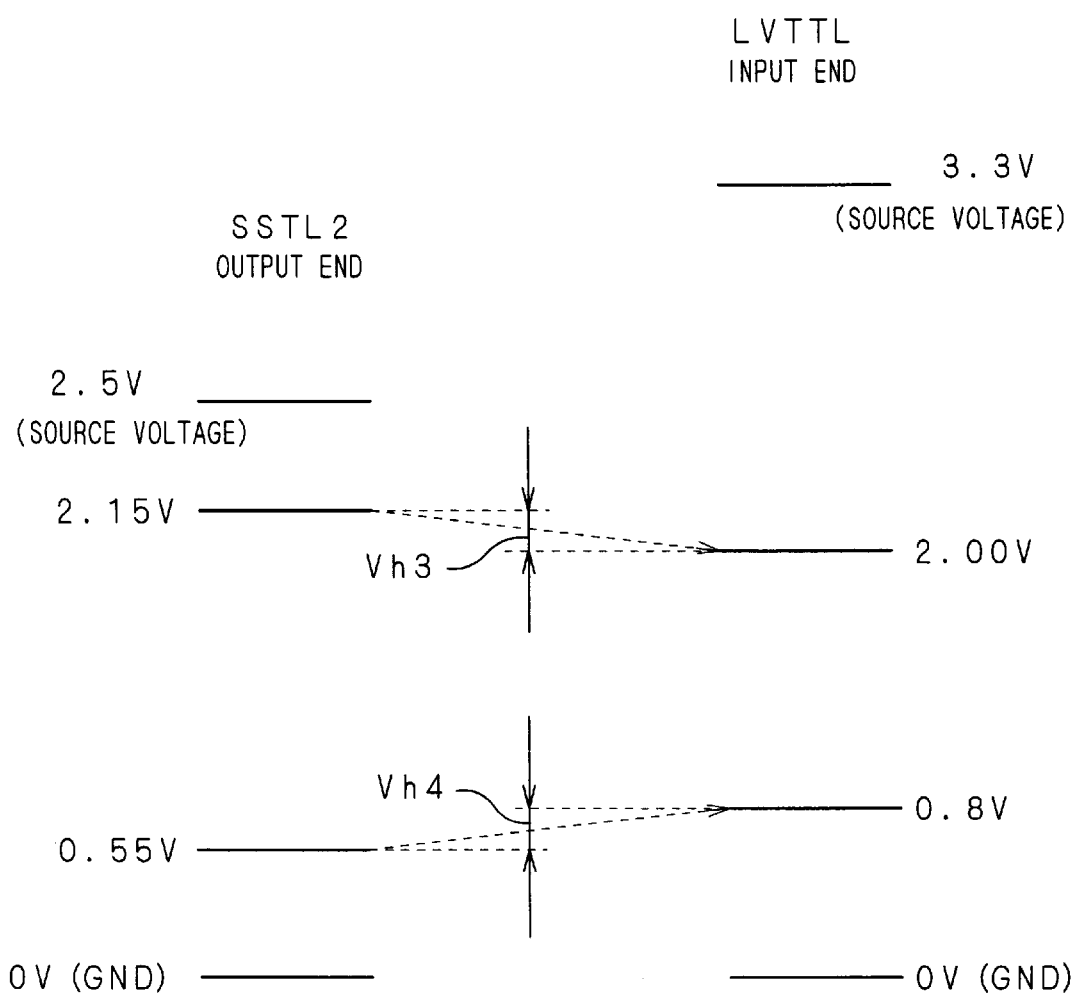
FIG. 3 is a schematic view showing an example of voltage levels at the output end and input end of signal.

FIG. 3 is a view showing voltage levels at the output end according to the SSTL2 standard, and voltage levels at the input end according to the LVTTL standard. The output end of the SSTL2 standard corresponds to the PAD circuit 6, and the input end of the LVTTL standard corresponds to the nonvolatile memory 14. As shown in FIG. 3, it is possible to provide a margin of Vh3=0.15 V between the minimum value (=2.15 V) of output voltages of high level conforming to the SSTL2 standard and the minimum value (=2.00 V) of the input voltages to be determined as high level ($V_{IH}$) conforming to the LVTTL standard, and additionally, it is possible to provide a margin of Vh4=0.25 V between the maximum value (=0.55 V) of output voltages ($V_{OL}$) of low level conforming to the SSTL2 standard and the maximum value (=0.8 V) of input voltages to be determined as low level ($V_{IL}$) conforming to the LVTTL standard. In this manner, by including the range of output voltages defined by the low voltage interface of the RAM 13 in the range of input voltages defined by the high voltage interface of the nonvolatile memory 14 while providing a certain margin therebetween, it is possible for the nonvolatile memory 14 to securely determine whether the logic level of the input signal is at high level or at low level.

(First Modified Example of First Preferred Embodiment)

As a concrete example for the first embodiment described above, explanation will now be made while indicating the schematic configuration view of a memory control circuit according to a first modified example for the first embodiment. The memory control circuit according to the first modified example includes a controller 1B for controlling two kinds of memories 24 and 25 having logic interfaces which are different in source voltage via buses 20, 21 and 22 and a signal line 23.

The first memory 24 is implemented by an SRAM having a capacity of about 8M bytes (M=$2^{20}$=$1024^2$) at maximum and conforms to the low voltage interface standard (SSTL2 standard) wherein operation source voltage is 2.5 V. The second memory 25 is implemented by a nonvolatile memory 25 having a capacity of about 8M bytes at maximum and conforms to the high voltage interface standard (LVTTL standard) wherein operation source voltage is 3.3 V.

As is the case of the controller 1A according to the first embodiment described above, the controller 1B includes a CPU 2, a MIU 3 and PAD circuits 6 and 7, and the PAD circuit 7 in this first modified example is further equipped with a level converter 7B for converting the level of voltage of a control signal transmitted from the memory controller 4. This level converter 7B operates in response to a control signal $PC_D$ supplied from the memory controller 4.

This controller 1B has output ports 8A and 8D for outputting an address signal and a control signal, and input/output ports 8B and 8C for inputting/outputting data from/to the memories 24 and 25. Between the output port 8A and the SRAM 24 is disposed the control bus 20 for transmitting an address signal and a control signal to and from the SRAM 24. Since this control bus 20 is connected with a controlling input terminal of the SRAM 24, and branches off in the course to be connected with a controlling input terminal of the nonvolatile memory 25, the SRAM 24 and the nonvolatile memory 25 share this control bus 20.

The control bus 20 consists of a total of 28-bit wide signal lines, concretely, 23-bit wide signal lines for transmitting address signals MA0, MA1, . . . , and MA22 (MA[22:0]), 2-bit wide signal lines for transmitting output enable signals OEB0 and OEB1 (OEB[1:0]), 2-bit wide signal lines for transmitting write enable signals WEB0 and WEB1 (WEB[1:0]) and a one-bit wide signal line for transmitting a chip select signal CS1. These signal lines for transmitting address signals MA[22:0] and output enable signals OEB[1:0] branch off to be connected also to the nonvolatile memory 25.

Also, the data bus 21 connected to the input/output port 8B connects with a data input/output terminal of the SRAM 24 and transmits data read out from the SRAM 24 and data to be written to the SRAM 24. This data bus 21 consists of a total of 16-bit wide signal lines, concretely, 16-bit wide signal lines for transmitting data signals MD0, MD1, . . . , and MD15 (MD[15:0]).

Also, the data bus 22 connected to the input port 8C is connected with a data output terminal of the nonvolatile memory 25 and transmits data read out from the nonvolatile memory 25. This data bus 22 consists of a total of 8 bits wide signal lines, concretely 8-bit wide signal lines for transmitting data signals RMD0, RMD1, . . . , and RMD7 (RMD[7:0]).

Further, the 1-bit wide signal line 23 connected with the output port 8D is connected to a controlling input terminal of the nonvolatile memory 25. This signal line 23 transmits a chip select signal CS2.

In the configuration as described above, the controller 1B operates in the following manner when accessing the SRAM 24. As is the case of the aforementioned first embodiment, first the CPU 2 issues an access request to the SRAM 24 with respect to the MIU 3. After approving the access request, the MIU 3 fetches an address signal AD0 and a control signal CT0 (address signal $AD_{in}$ and control signal $CT_{in}$) transferred from the CPU 2, and outputs them to the PAD circuit 6 in predetermined timing. Next, the PAD circuit 6 converts the voltage levels of the address signal $AD_{in}$ and the control signal $CT_{in}$ inputted from MIU 3 and outputs signals after conversion to the control bus 20 via the output port 8A.

In this first modified example, the memory controller 4 controls so that the SRAM 24 and the nonvolatile memory 25 are not accessed simultaneously. Accordingly, during the period when the memory controller 4 accesses the SRAM 24, the chip select signal CS 1 supplied to the SRAM 24 is kept at active high level. As a result of this, the SRAM 24 approves inputting of the address signals MA[22:0] and the control signals WEB[1:0].

When the write enable signals WEB[1:0] are at active voltage level, the CPU 2 outputs write data DO to the level converter 6B via the MIU 3. The level converter 6B converts the write data DO into data signals MD[15:0] having voltage level in conformance with the low voltage interface, and outputs them to the data bus 21 via the input/output port 8B. Next, the data signals MD[15:0] inputting from the data bus 21 to the SRAM 24 are written into a storage area designated by the address signals MA[22:0].

On the other hand, when the write enable signals WEB[1:0] are at nonactive voltage level, data signals MD[15:0] are read out from the storage area designated by the address signals MA Next, the controller 1B operates in the following manner when accessing the nonvolatile memory 25. As is the same with the aforementioned first embodiment, the CPU 2 issues an access request to the nonvolatile memory 25 with respect to the memory controller 4. After approving this access request, the memory controller 4 fetches an address signal AD0 and a control signal CT0 (signals $AD_{in}$ and $CT_{in}$) transferred from the CPU 2, and outputs them to the PAD circuit 6 in predetermined timing. Next, the PAD circuit 6 converts the voltage levels of the signals $AD_{in}$ and $CT_{in}$ inputted from the MIU 3 and outputs signals after conversion to the control bus 20 via the output port 8A.

Next, the memory controller 4 keeps the chip select signal CS1 to be supplied to the SRAM 24 at nonactive low level. As a result of this, all input signals to the SRAM 24 are masked.

Also, logic levels of the output enable signals OEB[1:0] supplied to the nonvolatile memory 25 are kept in active state, and the chip select signal CS2 is kept at high level. As a result of this, data is read out from the storage area designated by the address signals MD[22:0] and outputted to the data bus 22. Then the data signals RMD[7:0] input to the input port 8C and after subjecting to conversion of voltage level at the PAD circuit 7, travels to the "1" side terminal of the selector 5 as the readout data $RMD_{in}$. At this time, since the memory controller 4 supplies the selector 5 with the high level selection signal SC1, the selector 5 selects the readout data $RMD_{in}$ and outputs it to the CPU 2.

As described above, according to the memory control circuit of the first modified example, since the control bus 20 can be shared by the SRAM 24 and the nonvolatile memory 25 having different operation source voltages $V_{DD}$ of logic interface, it is possible to reduce the pin number of the input/output ports 8A to 8D at the controller 1C, and reduction of power consumption is realized.

(Second Modified Example of First Preferred Embodiment)

Next, the second modified example for the first embodiment will be explained. FIG. 5 is a schematic configuration view of a memory control circuit according to this second modified example. The configuration of this memory control circuit is almost as same as the circuit configuration for the first modified example shown in FIG. 4 except for the wire connecting the SDRAM 26, the nonvolatile memory 27 and buses 30 and 31. In FIG. 5, elements denoted by the same reference numerals shown in FIG. 4 are regarded as having the same functions as the elements of the above first modified example, and detailed explanation of which will be omitted.

Figure 4:
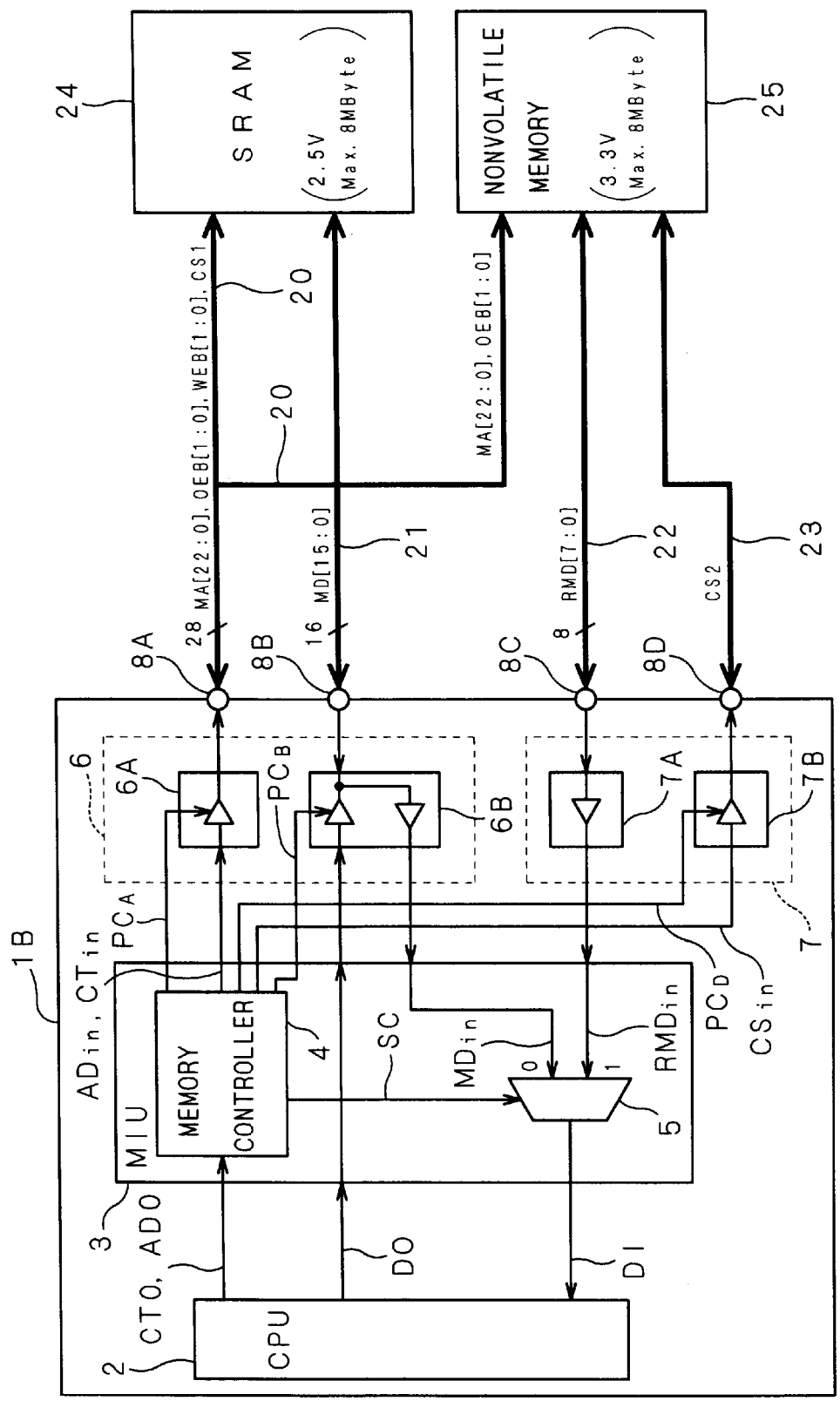
FIG. 4 is a schematic configuration view showing a memory control circuit according to a first modified example for the first embodiment.
Figure 5:
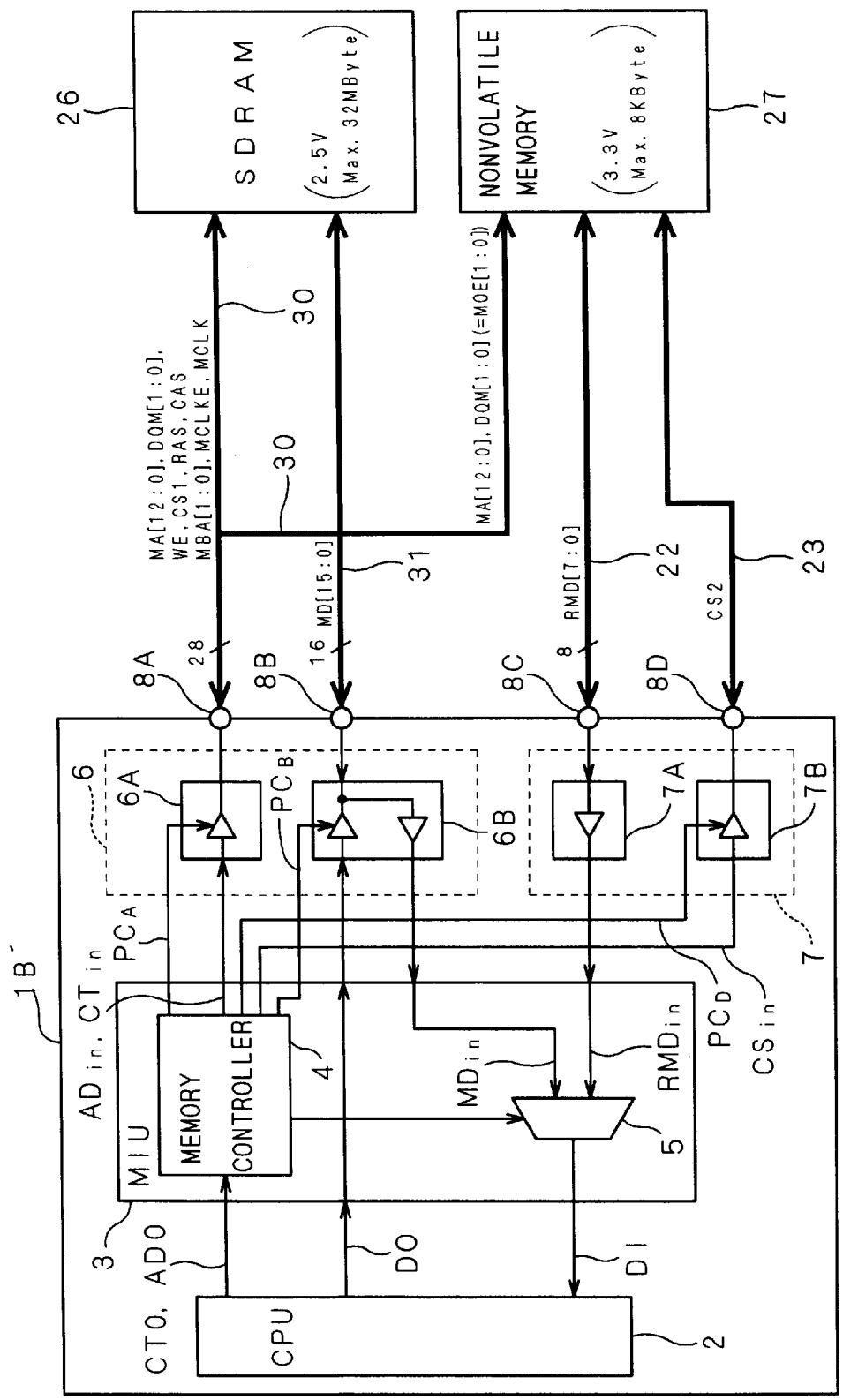
FIG. 5 is a schematic configuration view showing a memory control circuit according to a second modified example for the first embodiment.

The memory control circuit according to the second modified example includes a controller 1B' having almost the same configuration as the controller 1B shown in FIG. 4. This controller 1B' controls an SDRAM 26 having a capacity of about 32M bytes at maximum and supporting the standard wherein source voltage is 2.5 V (SSTL2 standard), and a nonvolatile memory 27 having a capacity of 8K bytes ($K=2^{10}=1024$) at maximum and supporting the standard wherein source voltage is 3.3V (LVTTL standard), and includes buses 30, 31 and 32 and a signal line 23 for connecting between these memories 26 and 27, and the controller 1B'.

Between the output port 8A and the SDRAM 26 of the controller 1B' is disposed a control bus 30 for transmitting an address signal and a control signal to and from the SDRAM 26. This control bus 30 is connected to an address input terminal and a controlling input terminal of the SDRAM 26, as well as branching off in the course to be connected to an address input terminal and a controlling input terminal of the nonvolatile memory 27. The control bus 30 consists of a total of 33-bit wide signal lines, concretely, 13-bit wide signal lines for transmitting address signals MA0, MA1, . . . , and MA12 (MA[12:0]), two-bit wide signal lines for transmitting mask signals DQM0 and DQM1 (DQM[1:0]), a 1-bit wide signal line for transmitting a write enable signal WE, a 1-bit wide signal line for transmitting row address strobe signal RAS, a one-bit wide signal line for transmitting a column address strobe signal CAS, two-bit wide signal lines for transmitting bank address signals MBA0 and MBA1 (MBA[1:0]), and a 1-bit wide signal line for transmitting a clock enable signal MCLKE and a 1-bit wide signal line for transmitting a clock signal MCLK.

From this control bus 30, a total of 15-bit wide signal lines for transmitting the aforementioned address signals MA[12:0] and mask signals DQM[1:0] branch off to be connected with an input terminal of the nonvolatile memory 27. During the access period to the nonvolatile memory 27, the output enable signals MOE0 and MOE1 (MOE[1:0]) are allocated to the mask signals DQM[1:0].

In the manner as described above, according to the memory control circuit of the second modified example, the control bus 30 for transmitting an address signal and a control signal to the SDRAM 26 branches off to be introduced to the nonvolatile memory 27, and the control bus 30 is shared with the memories 26 and 27. Therefore, it is possible to reduce the pin number of the input/output ports 8A and 8B at the controller 1B', and the power consumption can be reduced.

(Second Preferred Embodiment)

Figure 6:
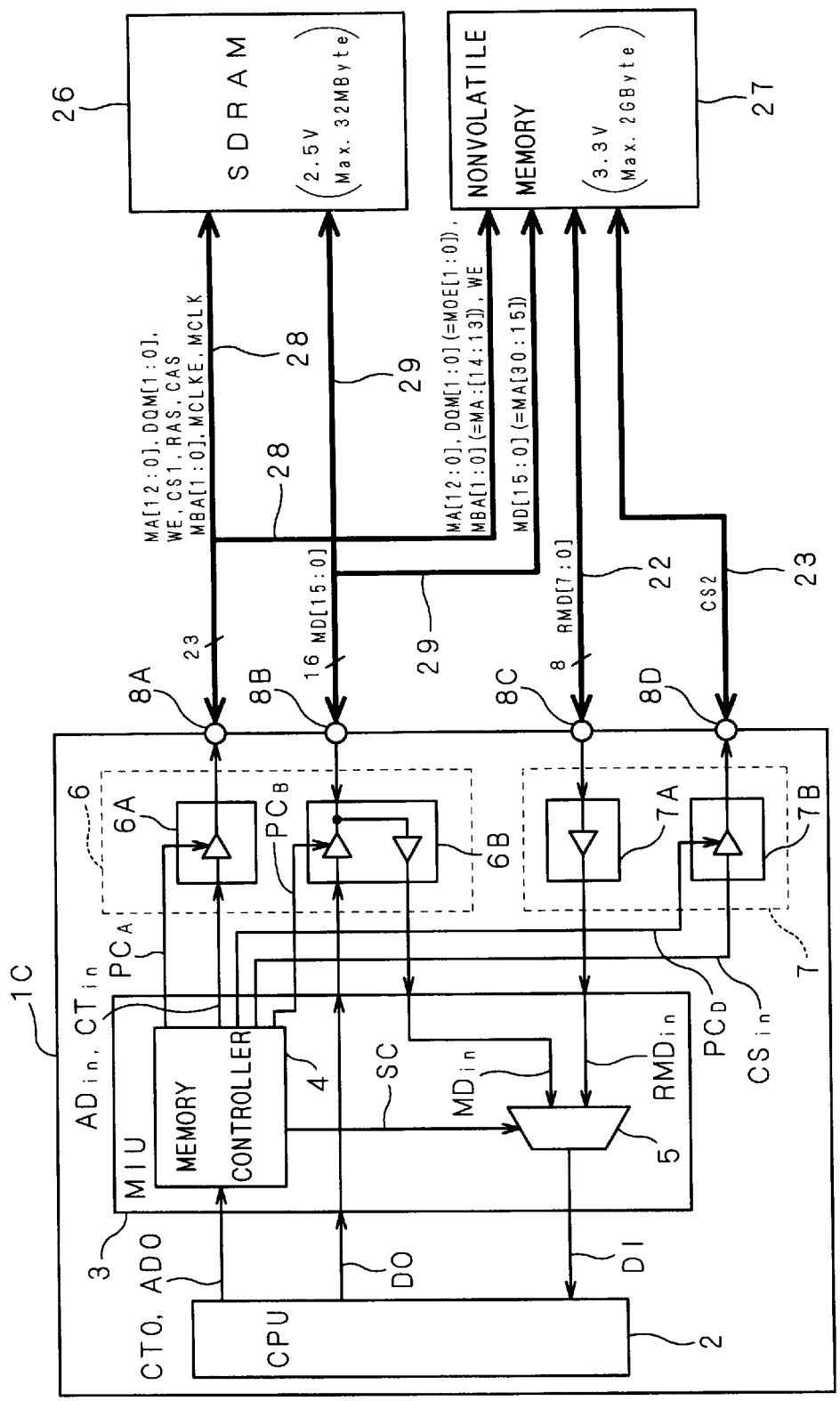
FIG. 6 is a schematic configuration view showing a memory control circuit according to the second embodiment of the present invention.

FIG. 6 is a memory control circuit according to the second embodiment of the present invention. The memory control circuit according to the second embodiment includes an SDRAM (Synchronous DRAM) 26 having a capacity of about 32M bytes at maximum, a nonvolatile memory 27 having a capacity of about 2G (G=$2^{30}$=$1024^3$) bytes at maximum, and a controller 1C for controlling these memories 26 and 27 via buses 28, 29 and 22, and a signal line 23. The SDRAM 26 conforms to the low voltage interface standard wherein source voltage is 2.5 V (SSTL2 standard), and the nonvolatile memory 27 conforms to the high voltage interface standard wherein source voltage is 3.3 V (LVTTL standard).

Similarly to the controller 1B according to the modified example for the first embodiment as described above, the controller 1C includes a CPU 2, a MIU 3 and PAD circuits 6 and 7. Between an output port 8A of this controller 1C and the SDRAM 26 is disposed a control bus 28 for transmitting an address signal and a control signal to and from the SDRAM 26. This control bus 28 is connected to a controlling input terminal of the SDRAM 26 and branches off in the course to be connected to a controlling input terminal of the nonvolatile memory 27. Therefore, the SDRAM 26 and the nonvolatile memory 27 share this control bus 28.

The control bus 28 consists of a total of 23-bit wide signal lines, concretely 13-bit wide signal lines for transmitting address signals MA0, MA1, ..., and MA12 (MA[12:0]), 2-bit wide signal lines for transmitting mask signals DQM0 and DQM1 (DQM[1:0]), a 1-bit wide signal line for transmitting a write enable signal WE, a 1-bit wide signal line for transmitting a row address strobe signal RAS, a 1-bit wide signal line for transmitting a column address strobe signal CAS, 2-bit wide signal lines for transmitting bank address signals MBA0 and MBA1 (MBA[1:0]), a 1-bit wide signal line for transmitting a clock enable signal MCLKE, and a 1-bit wide signal for transmitting a clock signal MCLK.

Also signal lines for respectively transmitting the above address signals MA[12:0], mask signals DQM[1:0], bank address signals MBA[1:0] and write enable signal WE also branch off to be connected to an input terminal of the nonvolatile memory 27. Herein, the signal lines for transmission of output enable signals MOE0 and MOE1 (MOE[1:0]) are allocated to signal lines for transmission of mask signals DQM[1:0], while signal lines for transmission of address signals MA13 and MA14 (MA[14:13]) are allocated to the signal lines for transmission of address signals MBA[1:0].

Also, the input/output port 8B of the controller 1C is connected to a data bus 29 having a 16-bit width for transmitting data signals MD0, MD1, ..., and MD15 (MD[15:0]) to and from the SDRAM 26. This data bus 29 branches in the course to be connected to an address input terminal of the nonvolatile memory 27. Incidentally, since the signal lines for transmission of address signals MA15, ..., and MA30 (MA[30:15]) are allocated to the signal lines for transmission of data signals MD[15:0], the nonvolatile memory 27 is supplied with a total of 31 bits of address signals MA[30:0].

On the other hand, between the input port 8C of the controller 1C and the nonvolatile memory 27 is disposed a data bus 22 having a 8-bit width for transmitting data signals RMD0, RMD1, ..., and RMD7 (RMD[7:0]). The signal line 23 of 1-bit width connected to the output port 8D also transmits a chip select signal CS2 to the nonvolatile memory 27.

In the memory control circuit having the above configuration, the controller 1C operates in the following manner when accessing the SDRAM 26. As is the case of the above first embodiment, the CPU 2 issues an access request to the SDRAM 26 with respect to the MIU 3. After approving this access request, the MIU 3 fetches an address signal AD0 and a control signal CT0 transferred from the CPU 2, and output them to the PAD circuit 6 in predetermined timing. Next, the PAD circuit 6 converts the voltage levels of the address signal $AD_{in}$ and the control signal $CT_{in}$ inputted from the MIU 3, and outputs signals after conversion to the control bus 28 via the output port 8A.

At this time, the chip select signal CS1 is kept at active high level. At the time of writing access, a write command is issued by combination of the above control signals, and data signals MD[15:0] transferred via the data bus 29 are written in the storage area designated by the address signals MA[12:0]. On the other hand, at the time of reading access, a readout command is issued by combination of the control signals, and data of the related storage area is read out and outputted to the data bus 29.

On the other hand, when the controller 1C accesses the nonvolatile memory 27, the nonvolatile memory 27 is kept in an active state wherein data readout is enabled as a result of receiving the chip select signal CS2 of high level and the output enable signals MOE[1:0], and the SDRAM 26 is kept in nonactive state by combination of the above control signal. Then, data is read out from the storage area designated by the address signals MA[30:0] and outputted to the data bus 22.

As described above, according to the memory control circuit of the second embodiment, the SDRAM 26 and the nonvolatile memory 27 share the control bus 28, whereby the control signals MOE[1:0] for the nonvolatile memory 27 are allocated to the signal lines for transmission of the control signals DQM[1:0] for the SDRAM 26, and the address signals MA[14:13] for the nonvolatile memory 27 are allocated to the signal lines for transmission of the control signals MBA[1:0] for the SDRAM 26. Furthermore, the memories 26 and 27 share the data bus 29, whereby the address signals MA[30:15] for the nonvolatile memory 27 are allocated to the signal lines for transmission of the data signals MD[15:0] for the SDRAM 26. Accordingly, the bit width of bus required for accessing the memories 26, 27 is decreased, so that it possible to reduce the number of pins at the controller 1C and to reduce the power consumption, as well as to extend the addressing range of the nonvolatile memory 27.

(Modified Example of Second Preferred Embodiment)

Figure 7:
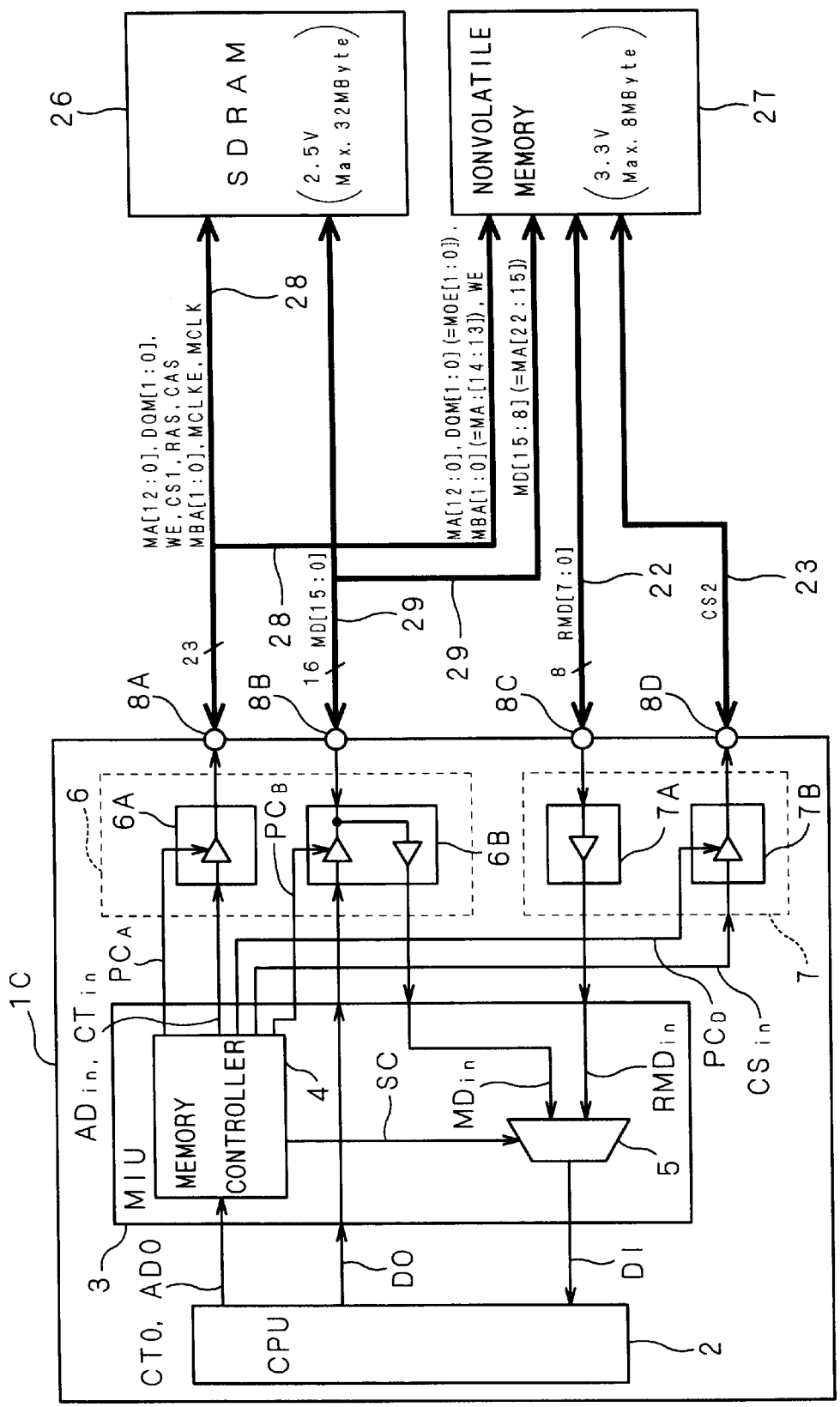
FIG. 7 is a schematic configuration view showing a memory control circuit according to a modified example for the second embodiment.

Next, a modified example for the above-described second embodiment will be explained. FIG. 7 is a schematic configuration view of a memory control circuit according to this modified example. This memory control circuit is configured in almost the same manner as the circuit configuration shown in FIG. 6 except for the memory capacity of a nonvolatile memory 27' to be used, and the manner of wire connection between this memory 27' and the buses 28 and 29.

As is the same with the above-described second embodiment, in the control bus 34, signal lines for transmitting the address signal MA[12:0] are connected to the address input terminal of the SDRAM 26, while other signal lines for transmitting the control signals DQM[1:0], WE, CS1, RAS, CAS, MBA[1:0], MCLKE and MCLK are connected to the controlling input terminal of the SDRAM 26. Also, signal lines for transmitting the address signals MA[12:0], the address signals MA[14:13] allocated to the bank address signals MBA[1:0], the output enable signals MOE[1:0] allocated to the mask signals DQM[1:0], and the write enable signal WE are connected to the address input terminal and the controlling input terminal of the nonvolatile memory 27'.

In the present modified example, the nonvolatile memory 27' has a capacity of about 8M bytes at maximum and conforms to the standard wherein source voltage is 3.3 V (LVTTL standard). Therefore, in comparison with the second embodiment, the memory capacity of the nonvolatile memory 27' is reduced, and the number of address input terminal of the nonvolatile memory 27' is reduced to 23.

In the present modified example, the signal lines of the data bus 29 branching to the nonvolatile memory 27' are connected so that they transmit 8-bit wide address signals MA[22:15] allocated to the signal lines for transmission of data signals MD[15:8].

In this manner, by changing the wire connection method for the bus 29 in accordance with the capacity of the nonvolatile memory 27', it is possible to decrease the bit width of the bus required to access to the memory and thus reduce the power consumption.

(Third Preferred Embodiment)

Figure 8:
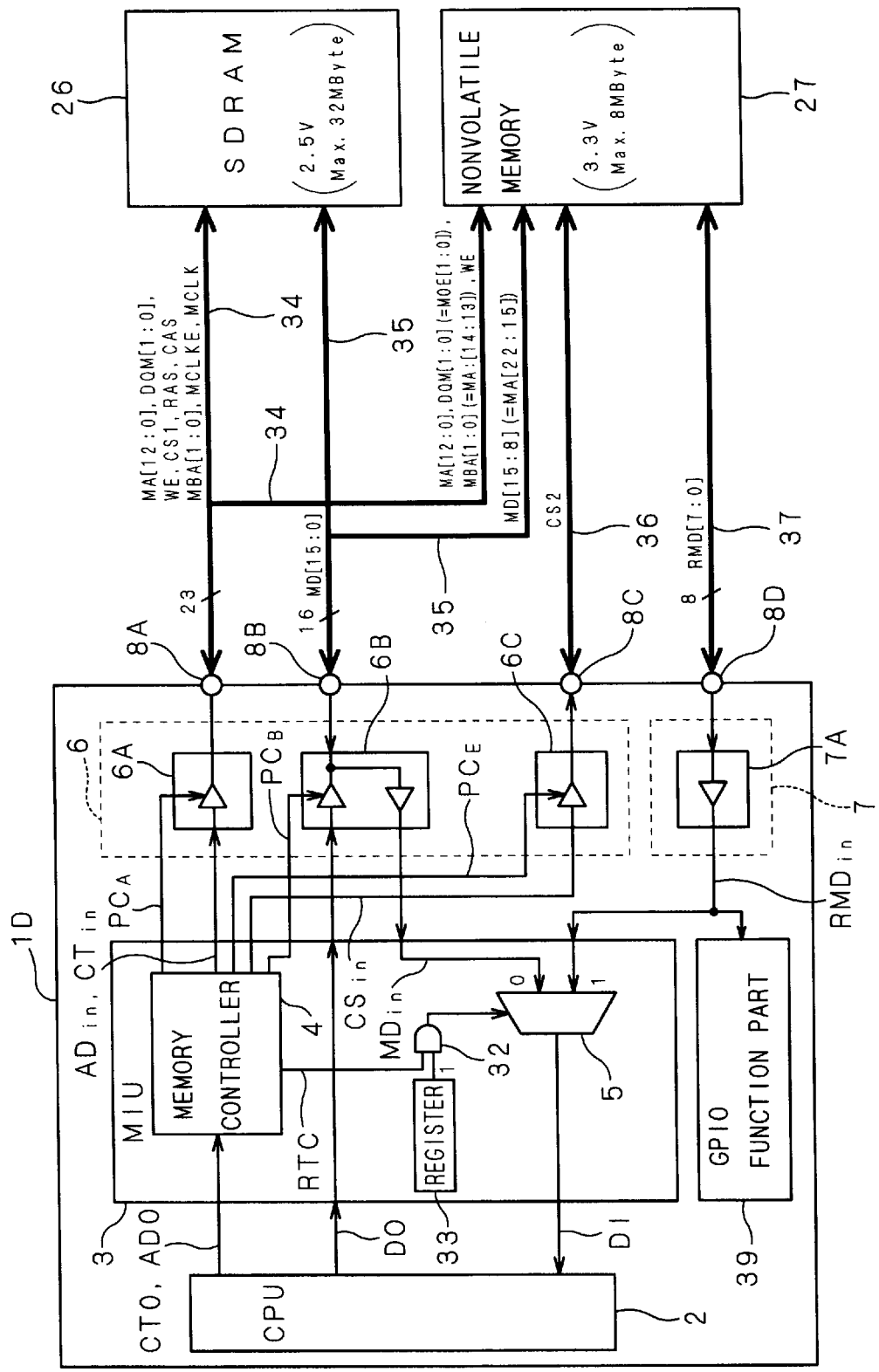
FIG. 8 is a schematic configuration view showing a memory control circuit according to the third embodiment of the present invention.

Next, the third embodiment of the present invention will be explained. FIG. 8 is a schematic configuration view of a memory control circuit according to the third embodiment. This memory control circuit includes a controller 1D for controlling an SDRAM 26 having a capacity of about 32M bytes at maximum and conforming to the standard wherein source voltage is 2.5 V (SSTL2 standard), and a nonvolatile memory 27 having a capacity of about 8M bytes at maximum and conforming to the standard wherein source voltage is 3.3 V (LVTTL standard).

The controller 1D includes a PAD circuit 6 having three kinds of level converters 6A, 6B and 6C supporting the low voltage interface of the SDRAM 26, a PAD circuit 7 having a level converter 7A supporting the high voltage interface of the nonvolatile memory 27, a CPU 2, a MIU 3, and a GPIO function part (General Purpose Input/Output Function Part) 39. The GPIO function part 39 has a general-purpose data input/output function for peripheral devices.

The MIU 3 in the third embodiment includes a register 33 and an AND gate 32, as well as a memory controller 4 and a selector 5. The register 33 stores either "1" indicating high level or "0" indicating low level. This AND gate 32 performs logical product operation on a signal outputted from the register 33 and a timing control signal RTC supplied from the memory controller 4, and outputs a high level signal to the selector 5 only when both of these signal are at high level. Accordingly, only when the value "1" is stored in the register 33, the timing control signal RTC becomes effective. When at least one of logic levels of the signal outputted from the register 33 and the timing control signal RTC is at low level, the AND gate 32 outputs a low level signal to the selector 5. During receiving the low level signal, the selector 5 selects data $MD_{in}$ inputted from the "0" side terminal and outputs it to the CPU 2, whereas during receiving the high level signal, the selector 5 selects data $RMD_{in}$ inputted from the "1" side terminal and outputs it to the CPU 2.

Also, the controller ID has input/output ports 8A to 8D, and between the output port 8A and the SDRAM 26 is disposed a control bus 34 for transmitting an address signal and a control signal. This control bus 34 branches in the course to be connected to the nonvolatile memory 27. The control bus 34 also consists of a total of 23-bit wide signal lines for transmitting the above-mentioned address signals MA[12:0], mask signals DQM[1:0], write enable signal WE, chip select signal CS1, row address strobe signal RAS, column address strobe signal CAS, bank address signals MBA[1:0], clock enable signal MCLKE and clock signal MCLK to the SDRAM 26.

A part of signal lines constituting the control bus 34 branches off to be connected to the nonvolatile memory 27. That is, the signal lines for transmitting the address signals MA[12:0], mask signals DQM[1:0], bank address signals MBA[1:0] and write enable signal WE branch off to be connected to the input terminal of the nonvolatile memory 27. During the period of accessing to the nonvolatile memory 27, the output enable signals MOE[1:0] are allocated to the signal lines for transmission of mask signals DQM[1:0], and the address signals MA[14:13] are allocated to the signal lines for transmission of bank address signals MBA[1:0].

Also between the input/output port 8B of the controller ID and the SDRAM 26 are disposed signal lines having a 16-bit width for transmitting data signals MD[15:0]. Among these signal lines for transmission of data signals MD[15:0], 8-bit wide signal lines for transmission of data signals MD[15:8] branch off to be connected to the address input terminal of the nonvolatile memory 27, and during accessing to the nonvolatile memory 27, the address signals MA[22:15] are allocated to these signal lines for transmission of data signals MD[15:8].

Also, the output port 8C of the controller ID is connected to a signal line 36 for transmitting the chip select signal CS2 to the nonvolatile memory 27. And the input port 8D is connected to an 8-bit wide data bus 37 for transmitting the data signals RMD[7:0] read out from the nonvolatile memory 27.

In the memory control circuit having the configuration as described above, the operation during the period of accessing the SDRAM 26 from the controller ID is as follows. The CPU 2 issues an access request to the SDRAM 26 with respect to the MIU 3. After approving the access request to the SDRAM 26 by arbitrating that access request and access requests transmitted from other processing modules, the MIU 3 fetches the an address signal AD0 and a control signal CT0 transferred from the CPU 2 and outputs them to the level converter 6A in predetermined timing. Next, the level converter 6A converts voltage levels of the address signal $AD_{in}$ inputted from the memory controller 4 and the control signal $CT_{in}$ in conformance with the low voltage interface of the SDRAM 26, and outputs signals after conversion to the control bus 34 via the output port 8A.

In writing access to the SDRAM 26, a write command is issued by combination of the above control signals $CT_{in}$. Write data DO outputted from the CPU 2 is transferred to the level converter 6B via the MIU 3. Then, the level converter 6B converts the voltage level of the inputting write data DO in timing according to the control signal $PC_A$ supplied from the memory controller 4, and outputs the resultant data to a data bus 35 via the input/output port 8B. Then the SDRAM 26 executes an operation of writing the data signals MD[15:0] transmitted through the data bus 35 in response to the above write command into a storage area designated by the address signals MA[12:0]. Contrarily, in reading access to the SDRAM 26, a readout command is issued by combination of the above control signal $CT_{in}$. At this time, the SDRAM 26 reads out the data signals MD[15:0] from a storage area designated by the address signals MA[12:0] in accordance with the readout command and outputs them to the data bus 35. The data signals MD[15:0] inputted to the input/output port 8B are subjected to conversion of voltage level by means of the level converter 6B and outputted to the "0" side terminal of the selector 5 as readout data $MD_{in}$.

On the other hand, the operation during access to the nonvolatile memory 27 from the controller ID is as follows. The CPU 2 issues an access request to the nonvolatile memory 27 with respect to the MIU 3. After approving this access request, the MIU 3 fetches an address signal AD0 and a control signal CT0 transferred from the CPU 2, and outputs them to the level converter 6A and the level converter 6C in predetermined timing. Next, the level converter 6A converts voltage levels of the address signal $AD_{in}$ and the control signal $CT_{in}$ inputted from the memory controller 4 in conformance with the low voltage interface of the SDRAM 26 in timing of control signal $PC_A$ supplied from the memory controller 4 and outputs signals after conversion to the control bus 34. On the other hand, at the level converter 6C, the voltage level of the chip select signal $CS_{in}$ inputted from the memory controller 4 is converted in timing of the control signal $PC_E$ supplied from the memory controller 4 in conformance with the low voltage interface and a chip select signal CS2 after conversion is outputted to the signal line 36 via the input port 8C.

During the access to the nonvolatile memory 27, the SDRAM 26 is in a nonactive state where input signals are masked. The nonvolatile memory 27 reads out data based on the address signals MA[22:0] and the control signals MOE [1:0] transmitted through the control bus 34 and the data bus 35 and output the data to the data bus 37. Then the data signals RMD[7:0] inputted to the input port 8D are subjected to conversion of voltage level by means of the level converter 7A, and outputted to the GPIO function part 39 and the "1" side terminal of the selector 5 as readout data $RMD_{in}$. The selector 5 outputs the readout data $RMD_{in}$ inputting to the "1" side terminal to the CPU 2 based on the high level selection signal supplied from the AND gate 32. Also, the readout data $RMD_{in}$ may be outputted to peripheral devices via the GPIO function part 39.

(Modified Example of Third Preferred Embodiment)

Figure 9:
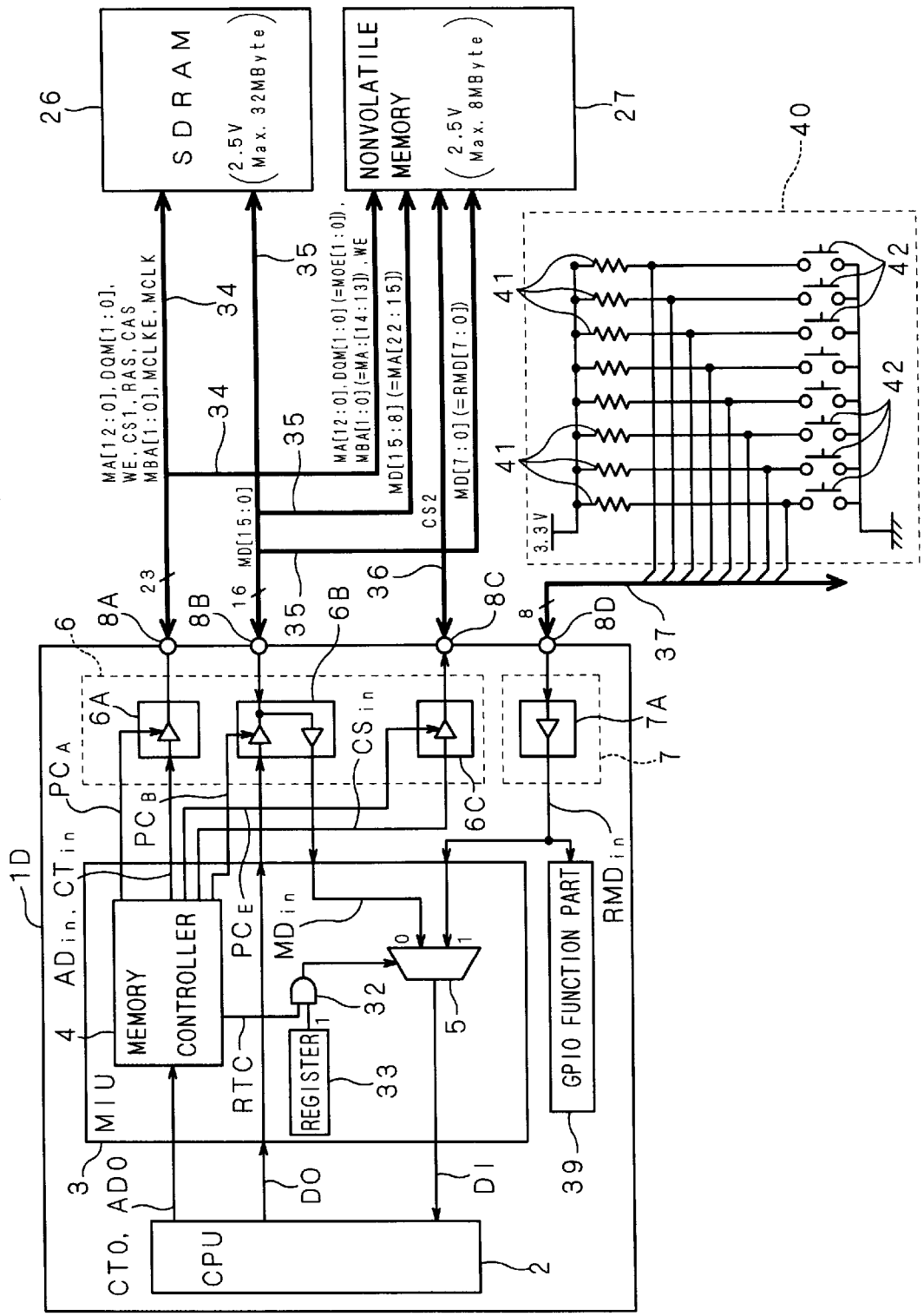
FIG. 9 is a schematic configuration view showing a memory control circuit according to a modified example for the third embodiment.

Next, a modified example for the above-described third embodiment will be explained. FIG. 9 is a schematic configuration view of a memory control circuit according to the present modified example. In FIG. 9, elements denoted by the same reference numerals shown in FIG. 8 have almost the same functions as the elements as described above, and detailed explanation of which will be omitted.

The memory control circuit according to this modified example comprises the controller 1D in the above-described third embodiment, memories 26 and 27" supporting the standard wherein source voltage is 2.5 V (SSTL2 standard), buses 34 and 35, and a control line 36. Unlike the cases of the above-described first to third embodiments, the logic interface for the two kinds of memories 26 and 27" for the controller 1D is the same. Therefore, by branching the data bus 35, access to the data input/output terminal of the nonvolatile memory 27" can be achieved. Therefore, the SDRAM 26 and the nonvolatile memory 27" share the data bus 35. Also, the 16-bit wide data bus 35 connecting the input/output port 8B of the controller 1D and the SDRAM 26 branches off in the same manner as the third embodiment described above to be connected to the address input terminal of the nonvolatile memory 27".

To a 8-bit wide bus 37 connected to the output port 8D of the controller 1D is connected a switch circuit 40. This switch circuit 40 includes 8 resistive elements 41, 41, . . . , 41 connected to the voltage source supply of 3.3 V, and 8 switches 42, 42, . . . , 42, each switch 42, . . . , 42 grounded at its one end, and connected to respective resistive element 41, . . . , 41 at its other end. Also, the other end of each switch 42, . . . , 42 is respectively connected to signal lines of the bus 37. Therefore, since a predetermined voltage is applied to the related signal line every time one switch 42 is turned ON, by combinations of "ON" and "OFF" of 8 switches 42, . . . , 42, 8-bit signals can be supplied to the input port 8D. The 8-bit signal is then supplied to the CPU 2 via the level converter 7A and the selector 5, with the result that the CPU 2 can perform various controls in response to detection of the 8-bit signal.

As described above, according to this modified example, since the buses 34 and 35 for transmitting address signals, control signals and data signals can be shared when two kinds of memories 26, 27" conforming to the same standard of voltage are used, it is possible to use the bus 37 that used to be a data bus in the third embodiment, for signal transmission other than sending and receiving of control signals and data signals supplied to the memories.

(Fourth Preferred Embodiment)

Next, the fourth embodiment of the present invention will be described.

Figure 10:
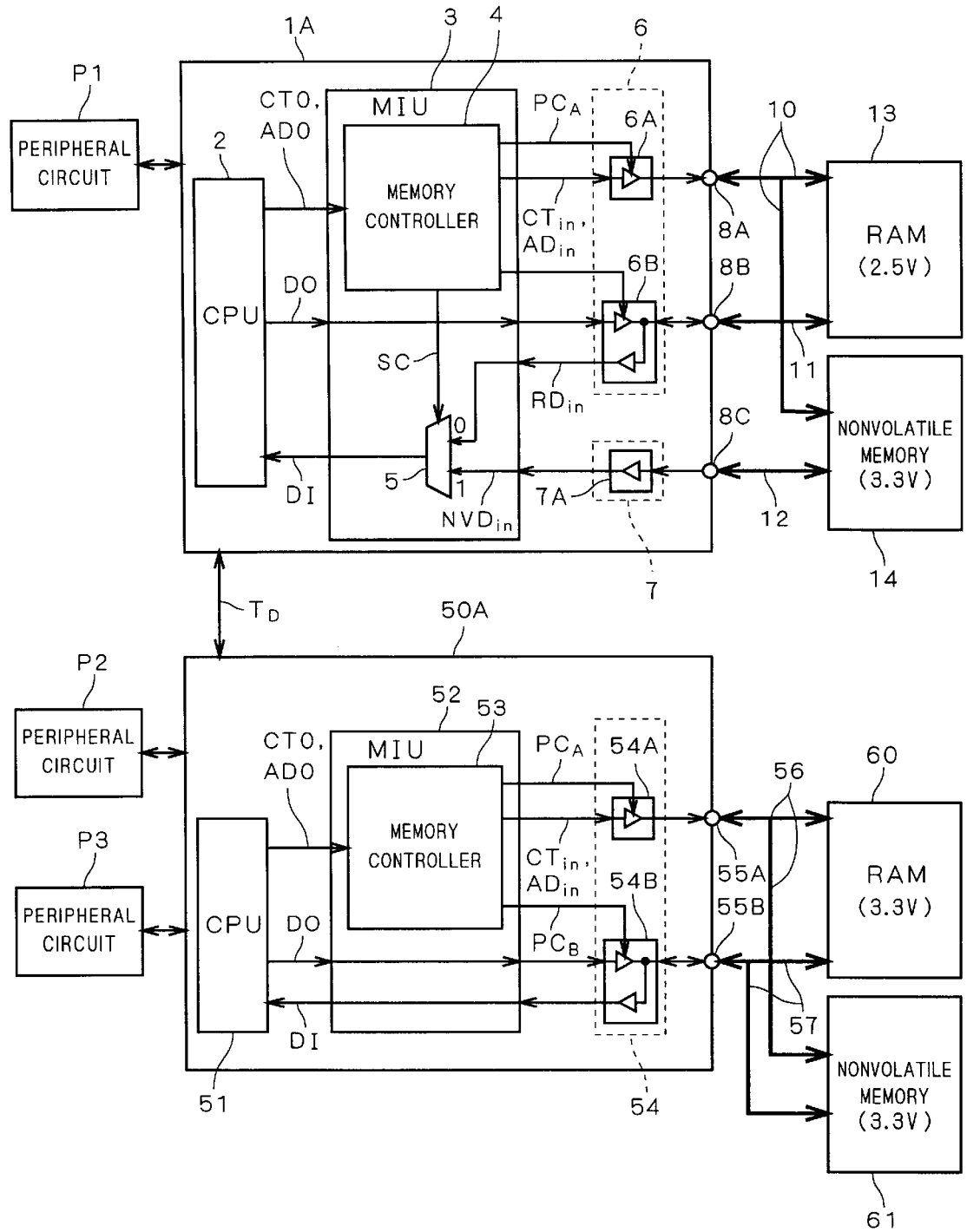
FIG. 10 is a schematic configuration view showing a memory control system.

FIG. 10 is a schematic view showing one example of configuration of a control system using the memory control circuit according to the first embodiment. First the configuration of the control system shown in FIG. 10 is described in detail, and then problems associated with that configuration will be explained.

In the present example, the controller 1A according to the first embodiment functions as a sub system for a main controller 50A. This main controller 50A operates while accessing the RAM 60 and the nonvolatile memory 61 driven at the common source voltage $V_{DD}$(=3.3 V), and includes a MIU (memory interface unit) 52 for performing memory management of these memories 60 and 61, a PAD circuit 54 for converting voltage levels of input/output signals in accordance with the logic interface of the RAM 60 and the nonvolatile memory 61, and a CPU 51. The main controller 50A is equipped with a memory controller 53 having a similar function as the memory controller 4 of the controller 1A.

Also, a control bus 56 connected to an output port 55A of the main controller 50A branches off to be connected to the RAM 60 and the nonvolatile memory 61, and a data bus 57 connected to an input/output port 55B branches off to be connected to the RAM 60 and the nonvolatile memory 61.

The PAD circuit 54 includes two kinds of level converters 54A and 54B controlled by control signals $PC_A$ and $PC_B$ transmitted from the memory controller 53. The level converter 54A has a function of converting voltage levels of internal signals $CT_{in}$ and $AD_{in}$ outputted from the MIU 52 and outputting signals after conversion to the control bus 56 via the output port 55A. The other level converter 54B has a function of converting voltage level of output data DO and outputting the signal after conversion to the data bus 57 via the input/output port 55B, as well as a function of converting voltage level of an input signal from the input/output port 55B to the internal voltage level and outputting input data DI.

These main controller 50A and controller 1A execute processes in synchronization with each other while sending/receiving processing data $T_D$ to/from each other. Though detailed description is omitted for convenience, the controller 1A and the main controller 50A are connected with various kinds of peripheral circuits P1, P2 and P3 via I/O circuits (not shown), and have a function of processing data inputted from these peripheral devices P1, P2 and P3. For example, in the case where this control system is incorporated in a digital still camera, a situation that uses a CCD pickup apparatus, a digital signal processing circuit such as compression/expansion processing circuit for executing compression coding and decoding of data and the like as the peripheral circuits P1, P2 and P3 can be considered. In this case, the main controller 50A processes a digital image signal inputted from the CCD pickup apparatus and transfers it to the controller 1A as transaction data $T_D$, and thereafter the controller 1A may control the compression/expansion circuit which is the peripheral device P1 to perform compression coding of the input data $T_D$.

The control system having the configuration as described above can be activated in the manner as summarized below. First as the power of the control system is turned on, the CPU 51 of the main controller 50A executes a command for loading a boot program from the nonvolatile memory 61 in response to a reset signal. That is, the CPU 51 issues an access request to the nonvolatile memory 61 with respect to the memory controller 53, and the memory controller 53 fetches an address signal AD0 and a control signal CT0 transferred from the CPU 51 after approving the access request and outputs these to the PAD circuit 54 as an address signal $AD_{in}$ and a control signal $CT_{in}$ in predetermined timing. Next, the level converter 54A of the PAD circuit 54 converts voltage levels of the signals $AD_{in}$ and $CT_{in}$ inputted from the MIU 52, and outputs signals after conversion to the control bus 56 via the output port 55A.

Next, a boot program required for activation of a main system is read out from the nonvolatile memory 61 and outputted to the data bus 57. Thereafter, the boot program is inputted to the PAD circuit 54 via the input/output port 55B, and subjected to level conversion at the level converter 54B. As a result of the level conversion, readout data DI is then loaded to the CPU 51.

Next, the CPU 51 executes the program thus loaded using the RAM 60 as a work area to initiate and activate the main system. The CPU 51 outputs data DO such as commands generated at the time of execution of that boot program to the data bus 57 via the level converter 54B and the input/output port 55B for temporarily storing in the RAM 60. The CPU 51 also reads out data temporarily stored in the RAM 60 via the input/output port 55B and the level converter 54B to load it as data DO.

On the other hand, the CPU 2 of the controller 1A also loads a boot program stored in the nonvolatile memory 14 in response to a reset signal at the time of turning on the power, executes the boot program while using the RAM 13 as a work area to initiate and activate the sub system.

Figure 11:
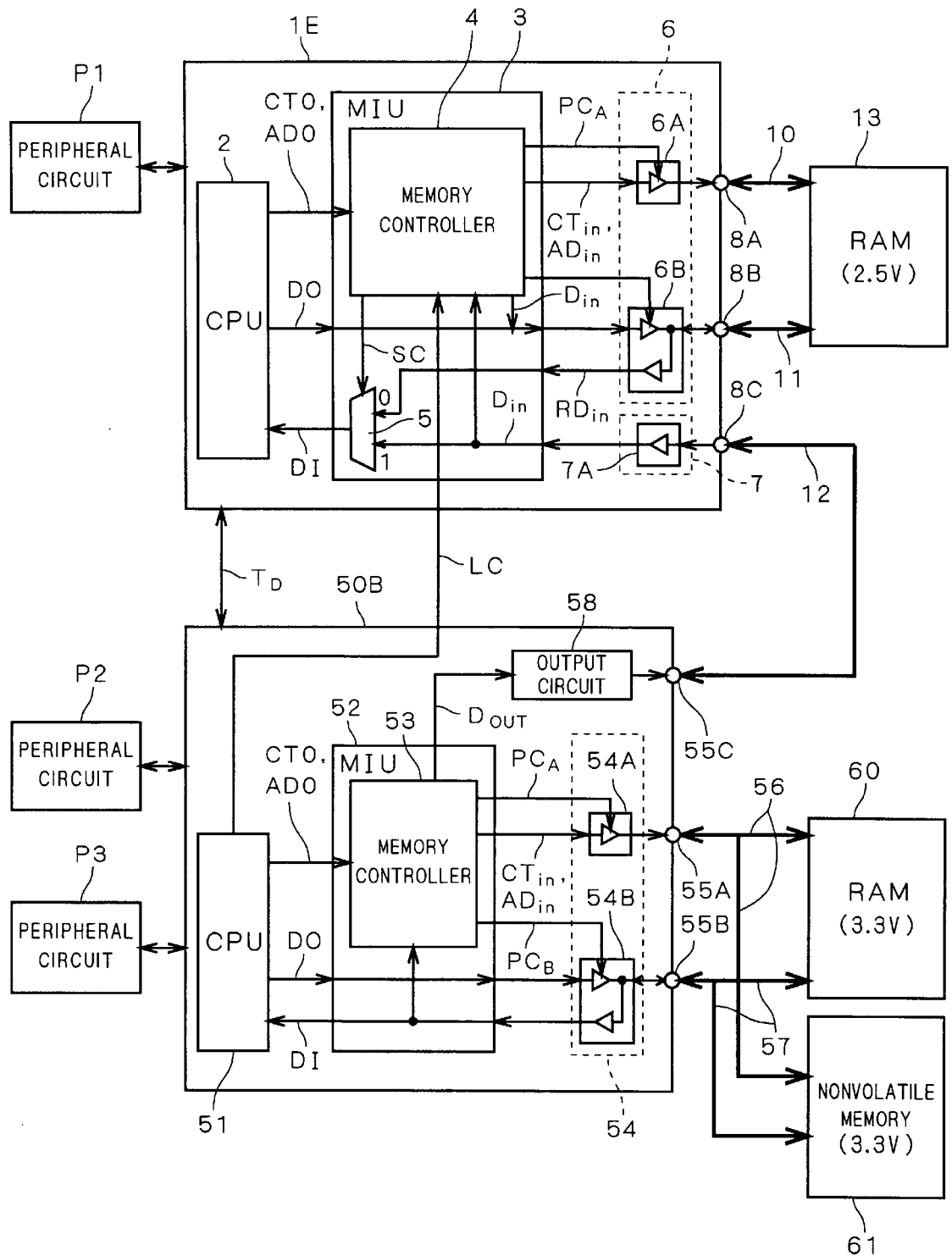
FIG. 11 is a schematic configuration view showing a control system according to the fourth embodiment of the present invention.

In the control system as described above, the main controller 50A constituting the main system and the controller 1A constituting the sub system individually have the respective nonvolatile memories 14 and 61. These two nonvolatile memories 14 and 61, however, pose the problem that the two IC chips increase the substrate area and increase the power consumption. This problem is successfully solved by the control system according to the fourth embodiment shown in FIG. 11. In FIG. 11, elements denoted by the same reference numerals shown in FIG. 10 are regarded as having the same functions as the elements of the above first modified example, and detailed explanation of which will be omitted.

The control system according to the fourth embodiment includes a main controller 50B constituting a main system and a controller 1E constituting a sub system, and the controller 1E functions as a slave circuit of the main controller 50B. In this control system, the nonvolatile memory 61 of the main system stores a first boot program for activation of the main system and a second program for activation of the sub system, and the sub system is activated by controlling the main system.

The control system shown in FIG. 11 is activated in the manner as follows. First, as the power of this control system is turned on, the CPU 51 is reset in the same activation manner as described above. Next, the CPU 51 loads the first boot program stored in the nonvolatile memory 61 and executes this first boot program to initiate and activate the main system.

Next, the CPU 51 reads out the second boot program stored in the nonvolatile memory 61 and executes a command to be transferred to the controller 1E. That is, the CPU 51 issues an access request so as to load the second boot program from the nonvolatile memory 61 with respect to the memory controller 53. In response to this access request, the memory controller 53 accesses the nonvolatile memory 61 via the control bus 56. As a result of this, the second boot program read out from the nonvolatile memory 61 is transmitted through the data bus 57 and inputted to the level converter 54B via the input/output port 55B. The level converter 54B converts the level of the data signal of the second boot program and outputs it to the memory controller 53.

Also, the memory controller 53 outputs the data signal $D_{out}$ of the second boot program thus loaded to the output port 55C via an output circuit 58. The output port 55C and the input port 8C of the controller 1E of the sub system are connected via the data bus 12. A data signal outputted from the output port 55C travels the data bus 12 and inputs to the PAD circuit 7 via the input port 8C of the sub system. And after subjected to level conversion, the resultant data signal $D_{in}$ is outputted to the memory controller 4. In synchronization with this, the CPU 51 of the main controller 50B issues a load control signal $L_C$ with respect to the memory controller 4 of the controller 1E and controls so that the data signal $D_{in}$ of the second boot program outputted from the PAD circuit 7 is fetched.

Then the memory controller 4 outputs the data signal $D_{in}$ thus fetched to the level converter 6B in predetermined timing. The data signal $D_{in}$ is then subjected to level conversion at the level converter 6B, outputted from the input/output port 8B, and inputted to the RAM 13 through the data bus 11. As a result of this, the second boot program is written into the RAM 13, and the CPU 2 loads the second boot program from the RAM 13 to initiate and activate the sub system.

As described above, since the controller 1E of the sub system has a slave function of loading the second boot program stored in the nonvolatile memory 61 of the main system to be activated in response to the control of the main system, it can operate without requiring a memory storing a boot program at the sub system. Therefore, according this control system, it is possible to reduce the area of the substrate, and reduce the power consumption compared with the control system shown in FIG. 10.

In addition, the data bus 12 connected to the input port 8C of the controller 1E is originally designed for connection with a memory storing a boot program, however, by using this as a transmission path connecting between the controller 1E and the main controller 50B as shown in the fourth embodiment, it is possible to readily construct a sub system which loads a boot program from a main system.

Though in this fourth embodiment, a sub system wherein a slave function is added to the controller 1A according to the above first embodiment is employed without no limitation, equivalent control systems can be constructed by adding a slave function to the controller 1B, 1B', 1C and 1D according to the above-described first and second modified examples of the first embodiment, and the second and the third embodiments.

(Modified Example of Fourth Preferred Embodiment)

Figure 12:
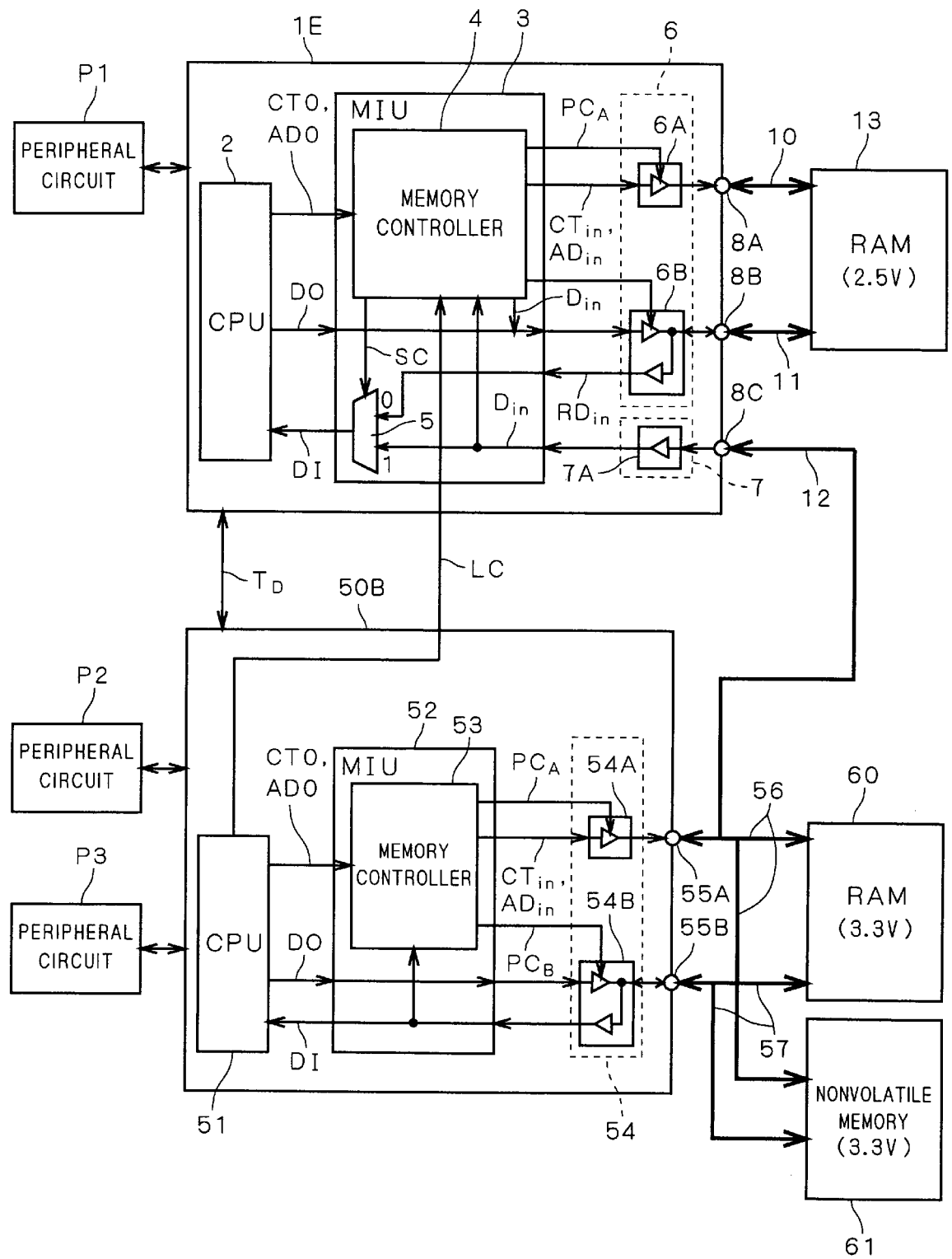
FIG. 12 is a schematic configuration view of a control system according to a modified example for the fourth embodiment.
Figure 13:
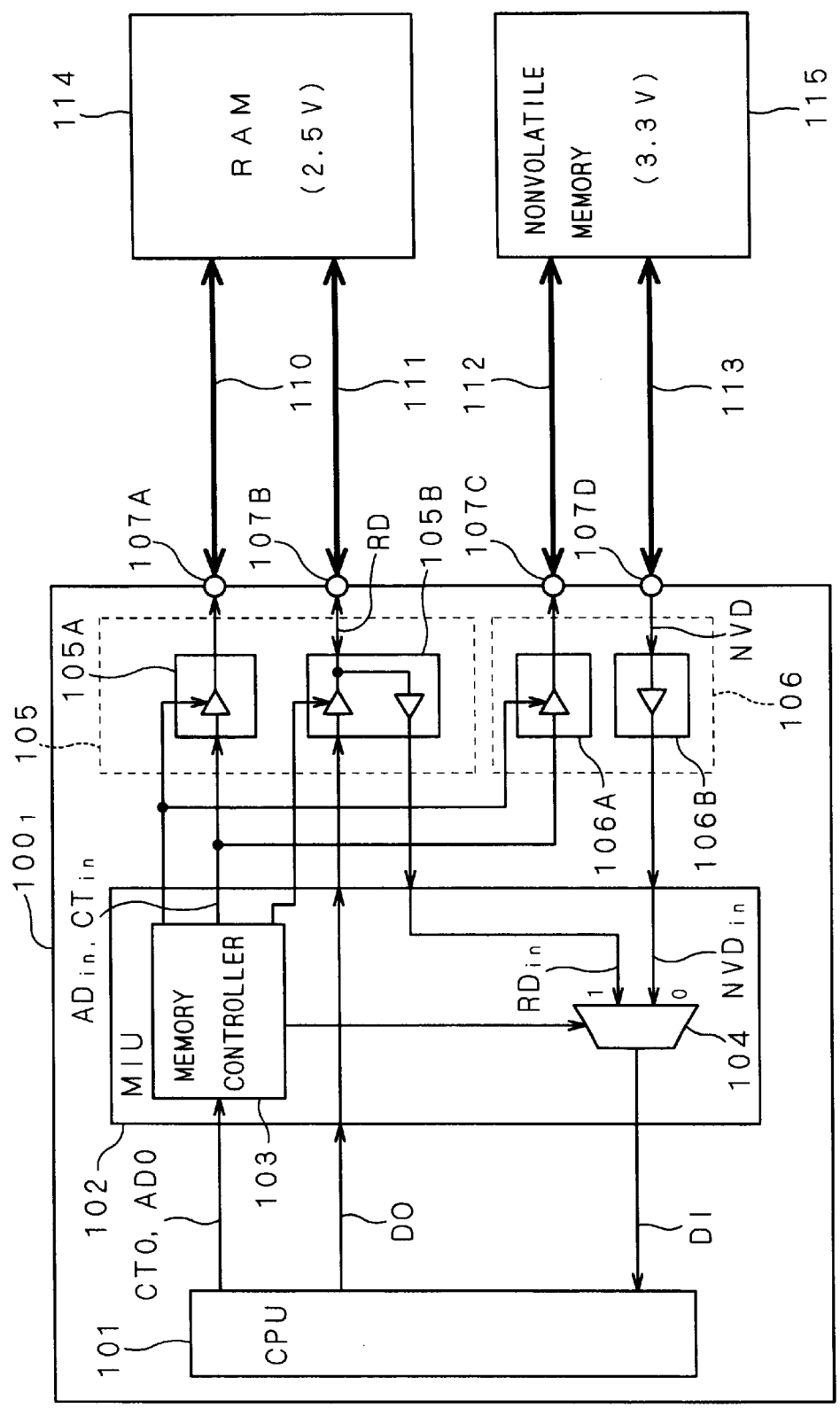
FIG. 13 is a schematic configuration view showing one example of a memory control circuit.
Figure 14:
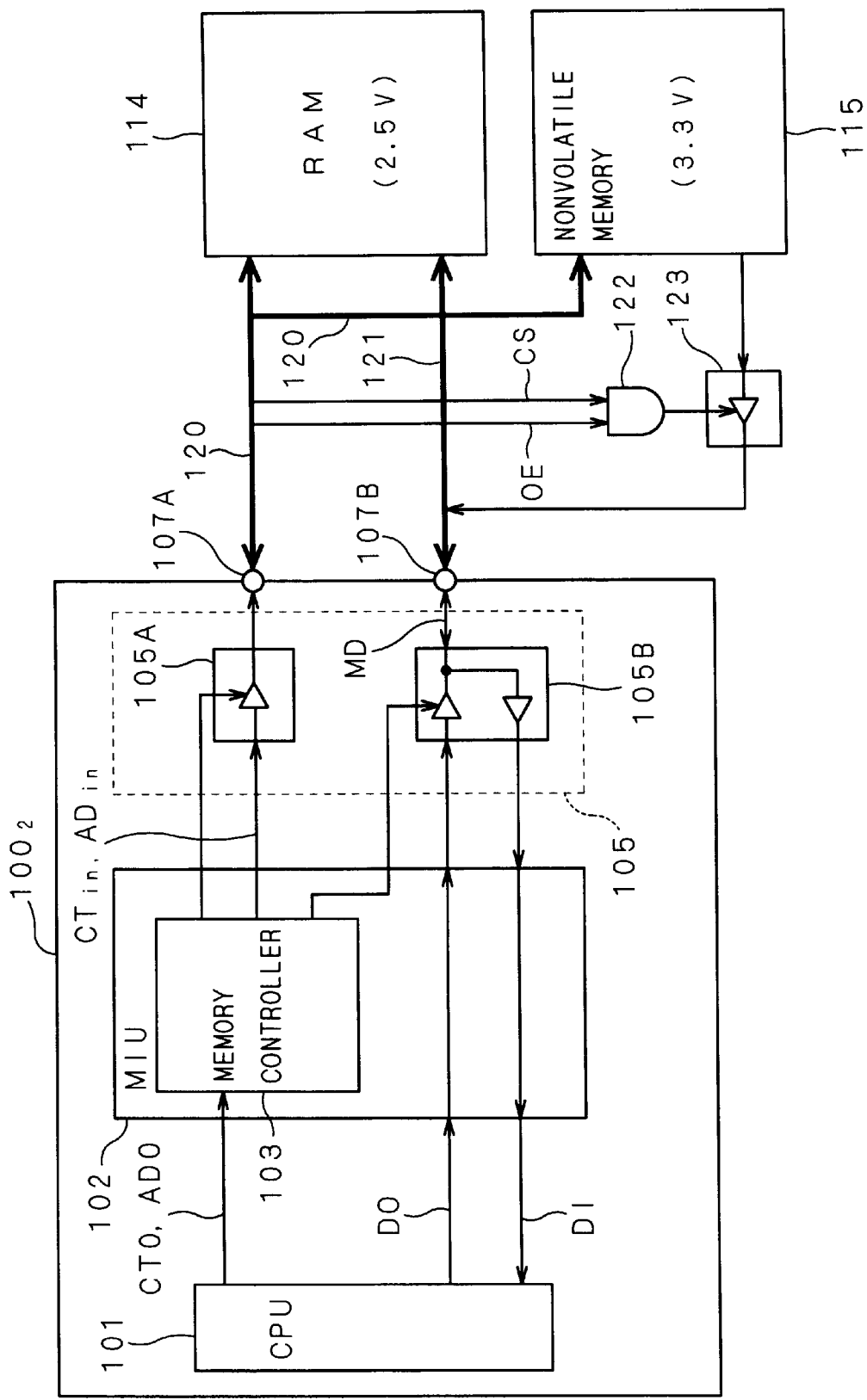
FIG. 14 is a schematic configuration view showing another example of a memory control circuit.

FIG. 12 is a view showing a modified example for the control system according to the fourth embodiment as described above. The control system shown in FIG. 12 differs from the control system shown in FIG. 11 in that it lacks the output circuit 58 and the output port 55C provided in the main controller 50B shown in FIG. 11, while alternatively, the data bus 12 connected to the input port 8C of the controller 1E branches off the control bus 56 of the main system. Other configurations are the same in these systems.

In this modified example, the data signal that was outputted from the output circuit 58 in the above-described fourth embodiment is outputted to the input port 8C of the sub system via the control bus 56. As described above, since the controller 1E of the sub system is connected to the data bus 12 branching off the control bus 56 of the main system, the output port 55C shown in FIG. 11 is no longer required, so that it is possible to reduce the pin number for inputting/outputting data.

While the invention has been described in detail, the foregoing description is in all aspects illustrative and not restrictive. It is understood that numerous other modifications and variations can be devised without departing from the scope of the invention.

What is claimed is:

1. A memory control circuit for controlling a plurality of memories having logic interfaces corresponding to different source voltages from each other, comprising:

a control bus including signal lines for transmitting an address signal and a control signal to and from a low voltage memory which operates at the minimum source voltage among said plurality of memories;

a first data bus including signal lines for transmitting data signals to and from said low voltage memory;

a second data bus including signal lines for transmitting data signals to and from a high voltage memory operating at a source voltage higher than said source voltage of said low voltage memory among said plurality of memories, and disposed independently from said first data bus; and a controller for accessing said low voltage memory and said high voltage memory via said control bus, first data bus and second data bus, wherein said control bus has signal lines which branch off the signal lines of said control bus to be connected to said high voltage memory and transmit the address signal and the control signal to said high voltage memory.

2. The memory control circuit according to claim 1, wherein said controller includes:

a first level converter for outputting said address signal and said control signal obtained by converting voltage levels of internal signals in accordance with an input voltage defined by said logic interface of said low voltage memory to said control bus;

a second level converter for converting voltage level of an input signal or an output signal in accordance with the input voltage or an output voltage defined by said logic interface of said low voltage memory, and sending/receiving said data signal via said first data bus; and a third level converter for converting voltage level of an input signal or an output signal in accordance with an input voltage or an output voltage defined by said logic interface of said high voltage memory, and sending/receiving said data signal via said second data bus.

3. The memory control circuit according to claim 2, wherein the range of output voltages defined by the logic interface of said low voltage memory is included in a range of input voltages defined by the logic interface of said high voltage memory.

4. The memory control circuit according to claim 2, wherein a RAM (random access memory) is used as said low voltage memory, and a nonvolatile memory is used as said high voltage memory.

5. The memory control circuit according to claim 4, wherein said first data bus branches off to be connected to said high voltage memory and transmits either one or both of said address signal and said control signal to said high voltage memory.

6. A memory control circuit having a controller circuitry which accesses one of a first memory group including a plurality of memories having logic interfaces corresponding to different source voltages from each other, and a second memory group including a second plurality of memories having logic interfaces corresponding to the same source voltage as each other, wherein when said controller circuitry accesses said first memory group, the memory control circuit according to any of claims 1 to 5 is provided, and when said controller circuitry accesses said second memory group, the control bus and the first data bus in the memory control circuit according to any of claims 1 to 5 are shared and connected with all said memories of said second memory group, and the second data bus in the memory control circuit according to any of claims 1 to 5 is used for signal transmission other than the sending/receiving of data signal to/from said memories.

7. A memory control circuit capable of controlling a plurality of memories having logic interfaces corresponding to different source voltages from each other, comprising:

a control bus including signal lines for transmitting an address signal and a control signal to and from a main memory which operates at the minimum source voltage among said plurality of memories;

a first data bus for transmitting a data signal to and from said main memory;

a second data bus for transmitting a data signal which conforms to a logic interface of a boot memory operating at a source voltage higher than said source voltage of said main memory among said plurality of memories; and a controller for accessing said main memory to perform activation process of said memory control circuit, wherein when said second data bus is not connected to said boot memory, said second data bus is connected to an external controller for transferring initial data required for said activation process, and said controller controls so as to store said initial data transferred from said external controller in said main memory and thereafter performs said activation process using said initial data.

8. The memory control circuit according to claim 7, wherein said controller includes:

a first level converter for outputting to said control bus the address signal and the control signal obtained by converting voltage levels of internal signals in accordance with an input voltage defined by said logic interface of said main memory;

a second level converter for converting voltage level of an input signal or an output signal in accordance with an input voltage or an output voltage defined by said logic interface of said boot memory, and sending/receiving said data signal via said first data bus; and a third level converter for converting voltage level of an input signal or an output signal in accordance with an input voltage or an output voltage defined by said logic interface of said external controller, and receiving said initial data via said second data bus.

9. A control system comprising: the memory control circuit according to claim 7 or 8; and the external controller for transmitting initial data required for activation process to said memory control circuit.

* * * * *